(12) United States Patent
Lee et al.

(10) Patent No.: US 9,698,857 B1
(45) Date of Patent: Jul. 4, 2017

(54) PATTERN DIVERSITY ASSISTED SINGLE-INPUT-SINGLE-OUTPUT AND TWO-BY-TWO MULTIPLE-INPUT-MULTIPLE OUTPUT (MIMO) ANTENNA SYSTEMS

(71) Applicant: AMAZON TECHNOLOGIES, INC., Seattle, WA (US)

(72) Inventors: Tzung-I Lee, San Jose, CA (US); Koohyun Um, Sunnyvale, CA (US); In Chul Hyun, San Jose, CA (US); Mercyma Deeba Balachandran, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 66 days.

(21) Appl. No.: 14/632,929

(22) Filed: Feb. 26, 2015

(51) Int. Cl.
| | |
|---|---|
| *H04B 7/00* | (2006.01) |
| *H04B 1/401* | (2015.01) |
| *H04B 7/0413* | (2017.01) |
| *H01Q 5/00* | (2015.01) |
| H04W 88/06 | (2009.01) |
| H04W 84/12 | (2009.01) |

(52) U.S. Cl.
CPC .............. *H04B 1/401* (2013.01); *H01Q 5/00* (2013.01); *H04B 7/0413* (2013.01); *H04W 84/12* (2013.01); *H04W 88/06* (2013.01)

(58) Field of Classification Search
CPC .... H04B 1/0075; H04B 1/401; H04B 7/0413; H01Q 1/242; H01Q 1/243; H01Q 5/314; H01Q 5/321; H01Q 5/328; H01Q 5/371; H01Q 5/392; H01Q 9/045; H01Q 9/0442; H01Q 5/00; H04W 84/12; H04W 88/06
USPC ........ 370/277, 297, 329, 339; 343/724, 826, 343/852, 853; 455/77
See application file for complete search history.

(56) References Cited

U.S. PATENT DOCUMENTS

| | | | | |
|---|---|---|---|---|
| 2005/0064897 | A1* | 3/2005 | Nohara | H04B 1/005 455/553.1 |
| 2009/0167627 | A1* | 7/2009 | Breiter | H01Q 1/243 343/852 |
| 2010/0248669 | A1* | 9/2010 | Jerng | H04B 1/0067 455/232.1 |
| 2015/0147980 | A1* | 5/2015 | Larsen | H01Q 5/321 455/77 |
| 2015/0340761 | A1* | 11/2015 | Feng | H01Q 5/371 343/724 |

* cited by examiner

*Primary Examiner* — Kwang B Yao
*Assistant Examiner* — Harun Chowdhury
(74) *Attorney, Agent, or Firm* — Lowenstein Sandler LLP

(57) ABSTRACT

Antenna structures and methods of operating the same of an electronic device are described. One apparatus includes an antenna element that is self-resonant at a first frequency in a first mode and self-resonant at a second frequency in a second mode. A radio frequency (RF) is coupled between the antenna element and a ground plane. A RF circuit, coupled to the antenna element via an RF feed, is operable to control the RF switch to switch the antenna element between the first mode and the second mode. The RF circuit is operable to cause the antenna element to radiate or receive electromagnetic energy in a first radiation pattern in the first mode and to radiate or electromagnetic energy in a second radiation pattern in the second mode.

20 Claims, 15 Drawing Sheets

PATTERN DIVERSITY ASSISTED
SINGLE-INPUT-SINGLE-OUTPUT AND
TWO-BY-TWO
MULTIPLE-INPUT-MULTIPLE OUTPUT
(MIMO) ANTENNA SYSTEMS

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
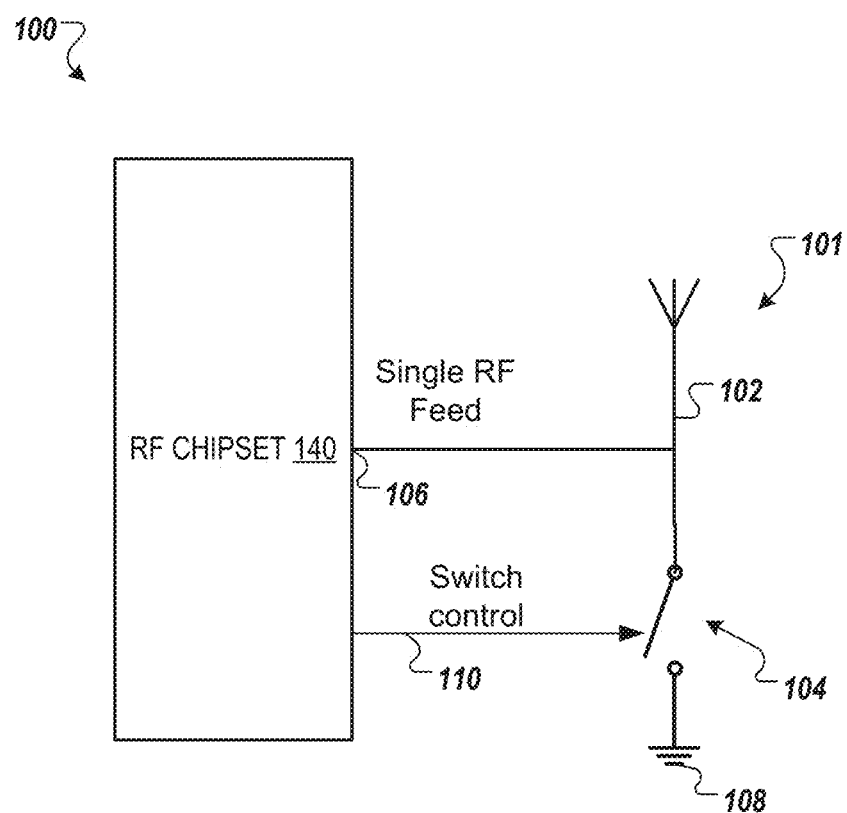
FIG. 1 is a block diagram of an antenna architecture of a user device with a pattern diversity assisted SISO antenna according to one embodiment.

Antenna structures and methods of operating the same of an electronic device are described. One apparatus includes an antenna element that is self-resonant at a first frequency in a first mode and self-resonant at a second frequency in a second mode. A radio frequency (RF) is coupled between the antenna element and a ground plane. A RF circuit, coupled to the antenna element via an RF feed, is operable to control the RF switch to switch the antenna element between the first mode and the second mode. The RF circuit is operable to cause the antenna element to radiate or receive electromagnetic energy in a first radiation pattern in the first mode and to radiate or electromagnetic energy in a second radiation pattern in the second mode.

In a constrained radiation space (low and thin profiles for mobile devices) of user devices, antenna engineers face various challenges. One challenge is antenna selection diversity to ensure wireless connectivity over channel fading caused by multipath and null spots of the antenna radiation pattern. To achieve the benefit of antenna diversity, a low envelope correlation coefficient (ECC) is needed. Traditionally, low ECC may be obtained by two or more antennas located in different orientations and/or locations. In such cases, more antenna space is needed to accommodate the additional antennas needed for a low ECC for antenna diversity. However, it is difficult to obtain low ECC with co-located antennas or closely coupled antennas.

The embodiments described herein are directed to pattern diversity assisted antennas. Some embodiments achieve low ECC for a single-input-single-output (SISO) antenna. Other embodiments achieve low ECC for a multiple-input-multiple-output (MIMO) antenna. Alternatively, the embodiments described herein may be used in various single-antenna or multi-antenna configurations. In one embodiment, a single antenna with two switchable modes is set forth for a pattern diversity assisted SISO antenna. The two modes of the antenna share the same antenna geometry but perform differently in terms of current flow and antenna radiation pattern, resulting in low ECC. Without requiring more space for multiple antennas, a single antenna element may be used and the single antenna element's current flow can be redirected in the two modes to effectively different radiation patterns. In order to achieve the best antenna diversity (low ECC), the antenna geometry of the antenna element should be designed to be self-resonant at two different frequencies. In another embodiment, two antennas with four modes are designed. In one embodiment, two antennas with four switchable modes are set forth for a pattern diversity assisted MIMO antenna. The four modes of the two antennas share the same antenna geometry but perform differently in terms of current flow and antenna radiation pattern, resulting in low ECC. Without requiring more space for multiple antennas (e.g., four antennas), existing two-by-two MIMO RF and antenna architecture and the two antenna elements' current flows can be redirected in the four modes to effectively different radiation patterns. In order to achieve the best antenna diversity, the antenna geometry of the antenna elements should be designed to meet the ECC requirement.

The antenna structures described herein can be used for Long Term Evolution (LTE) frequency bands, third generation (3G) frequency bands, Wi-Fi® and Bluetooth® frequency bands or other wireless local area network (WLAN) frequency bands, wide area network (WAN) frequency bands, global navigation satellite system (GNSS) frequency bands (e.g., positioning system (GPS) frequency bands, or the like.

FIG. 1 is a block diagram of an antenna architecture of a user device 100 with a pattern diversity assisted SISO antenna 101 according to one embodiment. The user device 100 includes a RF chipset 140 (also referred to herein as RF circuit and RF circuitry), a single RF feed 106, and the pattern diversity assisted SISO antenna 101. The pattern diversity assisted SISO antenna 101 includes an antenna element 102 and an RF switch 104. The antenna element 102 is self-resonant at a first frequency in a first mode and at a second frequency in a second mode. A first end of the antenna element 102 is coupled to the single RF feed 106. The RF switch 104 is coupled between the antenna element 102 and a grounding point 108, such as on a ground plane. The RF chipset 140 is operable to control the RF switch 104 to switch the antenna element 102 between the first mode and the second mode. The RF chipset 140 may control the RF switch 104 using a switch control signal 110. The RF chipset 140 is also operable to cause the antenna element 102 to radiate or receive electromagnetic energy in a first radiation pattern in the first mode and to radiate or electromagnetic energy in a second radiation pattern in the second mode.

In one embodiment, the RF switch 104 is a single-pole-single-throw (SPST) switch coupled between the antenna element and the grounding point 108. The RF chipset 140 is operable to control the SPST switch between a closed state and an open state. The RF switch 104 redirects the current flow applied on the antenna element 102 by the single RF feed 106. For example, the RF chipset 140 causes a first current flow on the antenna element 102 to achieve a first radiation pattern of electromagnetic energy in a first resonant mode when the SPST switch is in the closed state and causes a second current flow on the antenna element 102 to achieve a second radiation pattern of electromagnetic energy in a second resonant mode when the SPST switch is in the open state. The second radiation pattern is different than the first radiation pattern. In one embodiment, the antenna element is self-resonant at approximately 5.5 GHz when the SPST switch is in the closed state, and the antenna element 102 is self-resonant at approximately 2.4 GHz when the SPST switch is in the open state.

In one embodiment, the RF chipset 140 includes a wireless local area network (WLAN) module operable to cause the antenna element 102 to radiate or receive electromagnetic energy in a first frequency range (e.g., approximately 4.8 GHz and approximately 6.0 GHz) in the first mode and in a second frequency range (e.g., approximately 2.4 GHz and approximately 2.5 GHz) in the second mode. As described above, the antenna element 102 may be designed to be self-resonant at 5.5 GHz for the first mode (e.g., a loop mode) and at 2.4 GHz for the second mode (e.g., a monopole mode). These modes can be further matched to desired working bands of interest. For example, in dual-band Wi-Fi® networks, the antenna element 102 can be matched in the two modes to cover the 2.4 GHz band and the 5 GHz band. For example, the WLAN module may include a WLAN RF transceiver for communications on one or more Wi-Fi® bands (e.g., 2.4 GHz and 5 GHz). It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connection to the Internet wireless using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel. In other embodiments, the antenna architecture may include additional RF modules and/or other communication modules, such as a wireless local area network (WLAN) module, a GPS receiver, a near field communication (NFC) module, a Zigbee® module, an amplitude modulation (AM) radio receiver, a frequency modulation (FM) radio receiver, a personal area network (PAN) module (e.g., a Bluetooth® module), a Global Navigation Satellite System (GNSS) receiver, or the like. The RF chipset 140 may include one or multiple RFFE (also referred to as RF circuitry). The RFFEs may include receivers and/or transceivers, filters, amplifiers, mixers, switches, and/or other electrical components.

The RF chipset 140 may be coupled to a modem that allows the user device 100 to handle both voice and non-voice communications (such as communications for text messages, multimedia messages, media downloads, web browsing, etc.) with a wireless communication system. The modem may provide network connectivity using any type of digital mobile network technology including, for example, LTE, LTE advanced (4G), CDPD, GPRS, EDGE, UMTS, 1xRTT, EVDO, HSDPA, WLAN (e.g., Wi-Fi® network), etc. In the depicted embodiment, the modem can use the RF chipset 140 to radiate or receive electromagnetic energy on the antennas to communication data to and from the user device 100 in the respective frequency ranges. In other embodiments, the modem may communicate according to different communication types (e.g., WCDMA, GSM, LTE, CDMA, WiMAX, etc.) in different cellular networks.

In one embodiment, the antenna element operates as a loop antenna when the SPST switch is in the closed state and the antenna element 102 operates as a monopole antenna when the SPST switch is in the open state, as described below with respect to FIGS. 2-4.

The user device 100 (also referred to herein as an electronic device) may be any content rendering device that includes a modem for connecting the user device to a network. Examples of such electronic devices include electronic book readers, portable digital assistants, mobile phones, laptop computers, portable media players, tablet computers, cameras, video cameras, netbooks, notebooks, desktop computers, gaming consoles, Blu-ray® or DVD players, media centers, drones, and the like. The user device may connect to a network to obtain content from a server computing system (e.g., an item providing system) or to perform other activities. The user device may connect to one or more different types of cellular networks.

As described above, a diversity antenna, or a MIMO antenna, is a secondary antenna that may be used along with the one or more primary antennas to improve the quality and reliability of a wireless link. There may be no clear line-of-sight between a transmitter and a receiver. Instead, a signal may undergo multiple reflections between transmission and reception. Each reflection may introduce time delays, phase shifts, distortions, attenuations, etc. that can degrade a signal quality. The diversity antennas have a different location and/or configuration than the primary antennas on the user device, and may therefore experience different phase shifts, time delays, attenuations, distortions, etc. Accordingly, signals at the diversity antenna can be compared to signals at the primary antenna to determine and mitigate such effects. Using the embodiments described herein, a single antenna structure can be used in two resonant modes to create two radiation patterns to achieve a diversity pattern assisted antenna. That is, the RF chipset 140 can use the same antenna structure for two different radiation patterns to achieve diversity.

Figure 2:
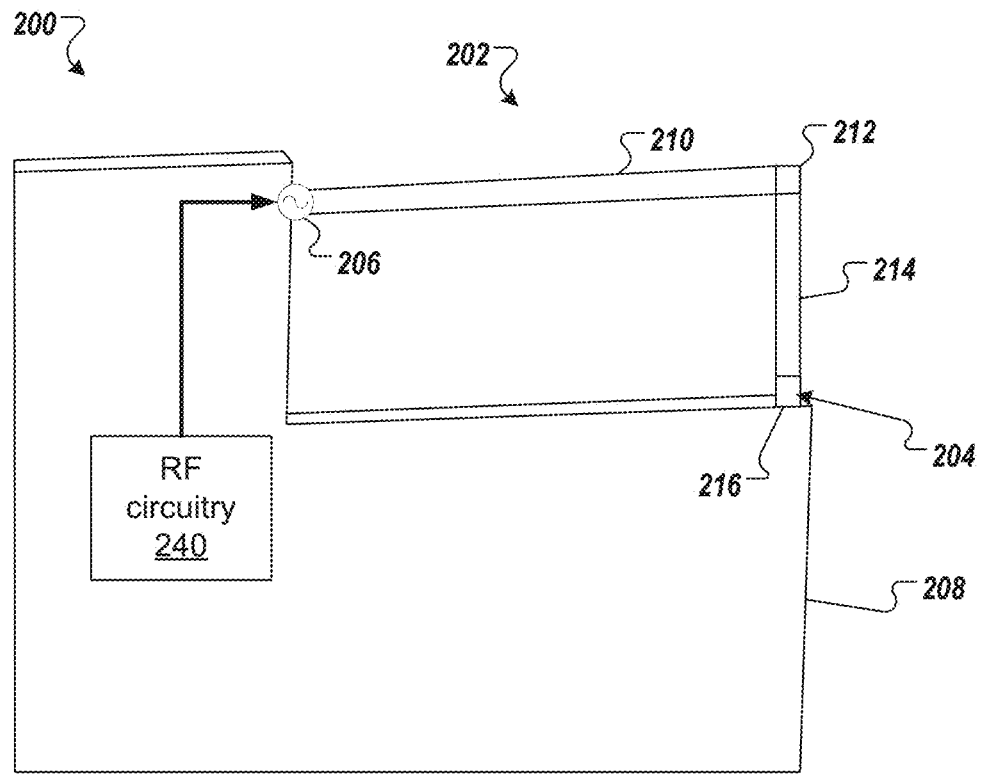
FIG. 2 illustrates a user device with a pattern diversity assisted SISO antenna according to one embodiment.

FIG. 2 illustrates a user device 200 with a pattern diversity assisted SISO antenna 202 according to one embodiment. The user device 200 includes the pattern diversity assisted SISO antenna 202, a single RF feed 206, RF circuitry 240, and ground plane 208. The pattern diversity assisted SISO antenna 202 includes a first arm 210 coupled to the single RF feed 206 at a first end. The first arm 210 extends in a first direction from the single RF feed 206 to a first fold 212 at a second end of the first arm 210. A second arm 214 is coupled to the second end of the first arm 210 at the first fold 212. The second arm 214 extends in a second direction from a first end of the second arm 214 at the first fold 212 to a second end of the second arm 214. The pattern diversity assisted SISO antenna 202 also includes a RF switch 204 coupled between the second arm 214 and a grounding point 216 on the ground plane 208. The RF switch 204 may be a SPST switch. For example, a first terminal of the SPST switch is coupled to the second end of the second arm 214 and a second terminal of the SPST switch is coupled to the grounding point 216 on the ground plane 208.

The RF circuitry 240 is operable to control the RF switch 204 to switch the pattern diversity assisted SISO antenna 202 between the first mode and the second mode. The RF circuitry 240 may control the RF switch 204 using a switch control signal (not illustrated in FIG. 2). Alternatively, other components can control the state of the RF switch 204. The RF circuitry 240 is also operable to cause the pattern diversity assisted SISO antenna 202 to radiate or receive electromagnetic energy in a first radiation pattern in the first mode and to radiate or electromagnetic energy in a second radiation pattern in the second mode. In this embodiment, the pattern diversity assisted SISO antenna 202 operates as a loop antenna in the first mode and as a monopole antenna in the second mode, as illustrated in FIG. 3 and FIG. 4, respectively.

Figure 3:
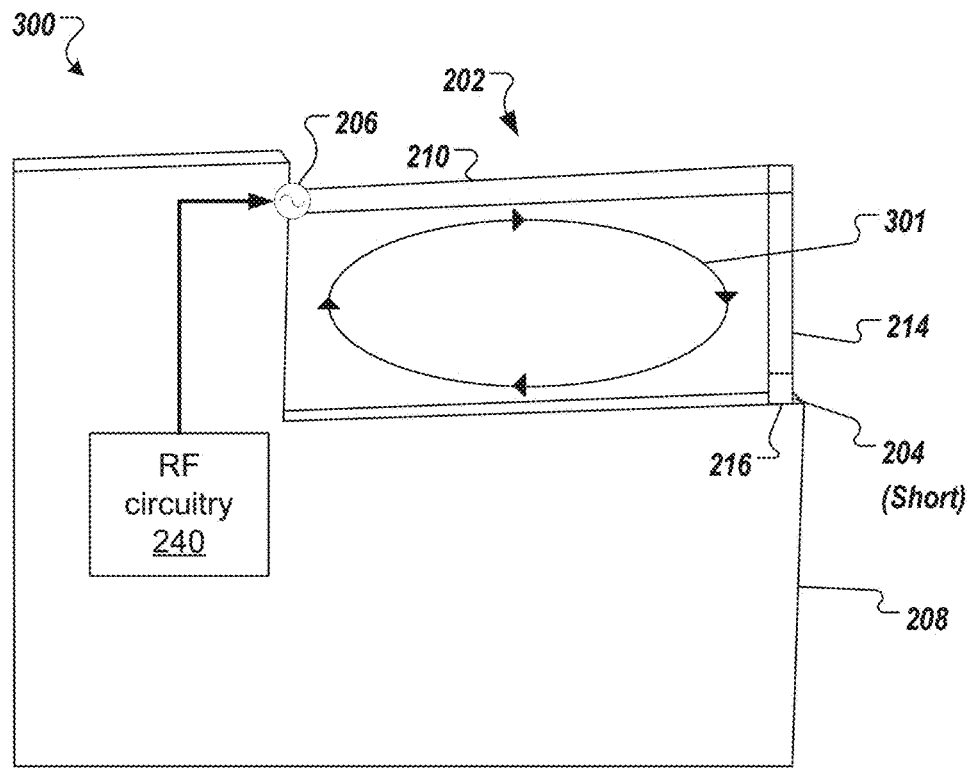
FIG. 3 illustrates a first current flow of the pattern diversity assisted SISO antenna of FIG. 2 in a first mode according to one embodiment.

FIG. 3 illustrates a first current flow 301 of the pattern diversity assisted SISO antenna 202 of FIG. 2 in a first mode 300 according to one embodiment. When in the first mode 300, the RF switch 204 is shorted. Thus, the first current flow 301 flows from the single RF feed 206 through the first arm 210 and second arm 214 through the shorted RF switch 204 to the grounding point 216 in a loop. The first current flow 301 results in the pattern diversity assisted SISO antenna 202 operating as a loop antenna to create the first radiation pattern.

Figure 4:
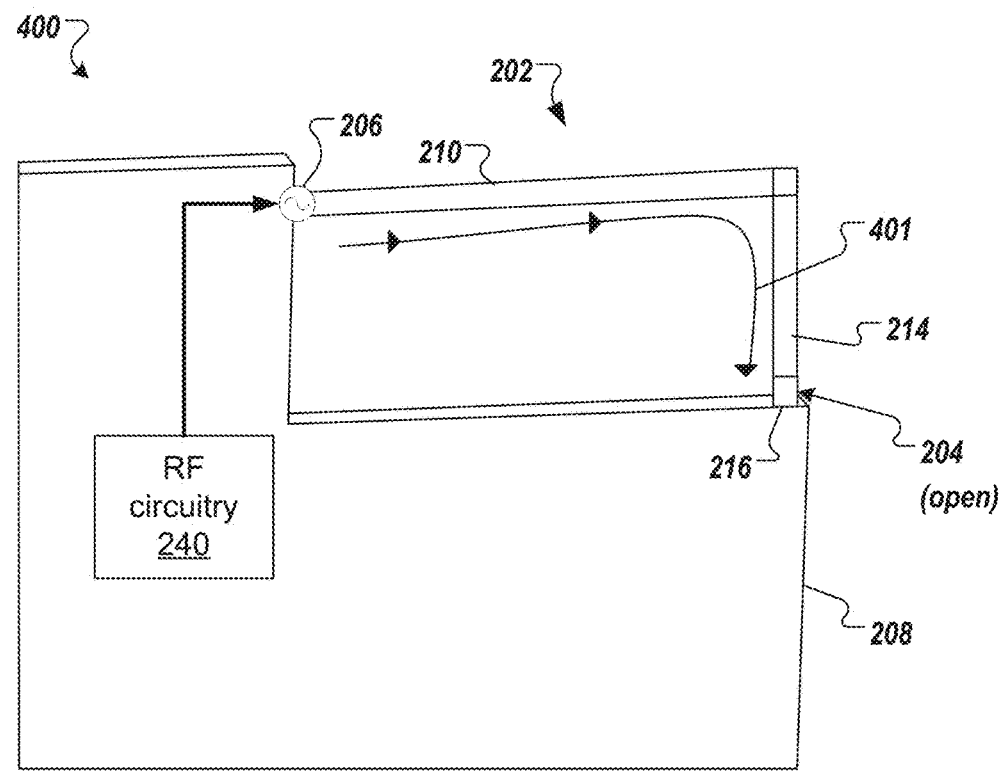
FIG. 4 illustrates a second current flow of the pattern diversity assisted SISO antenna of FIG. 2 in a second mode according to one embodiment.

FIG. 4 illustrates a second current flow 401 of the pattern diversity assisted SISO antenna 202 of FIG. 2 in a second mode 400 according to one embodiment. When in the second mode 400, the RF switch 204 is open. Thus, the second current flow 401 flows from the single RF feed 206 through the first arm 210 and second arm 214. However, the second current flow 401 does not pass to the grounding point 216 through the open RF switch 204. The second current flow 401 results in the pattern diversity assisted SISO antenna 202 operating as a monopole antenna to create the second radiation pattern.

Figure 5:
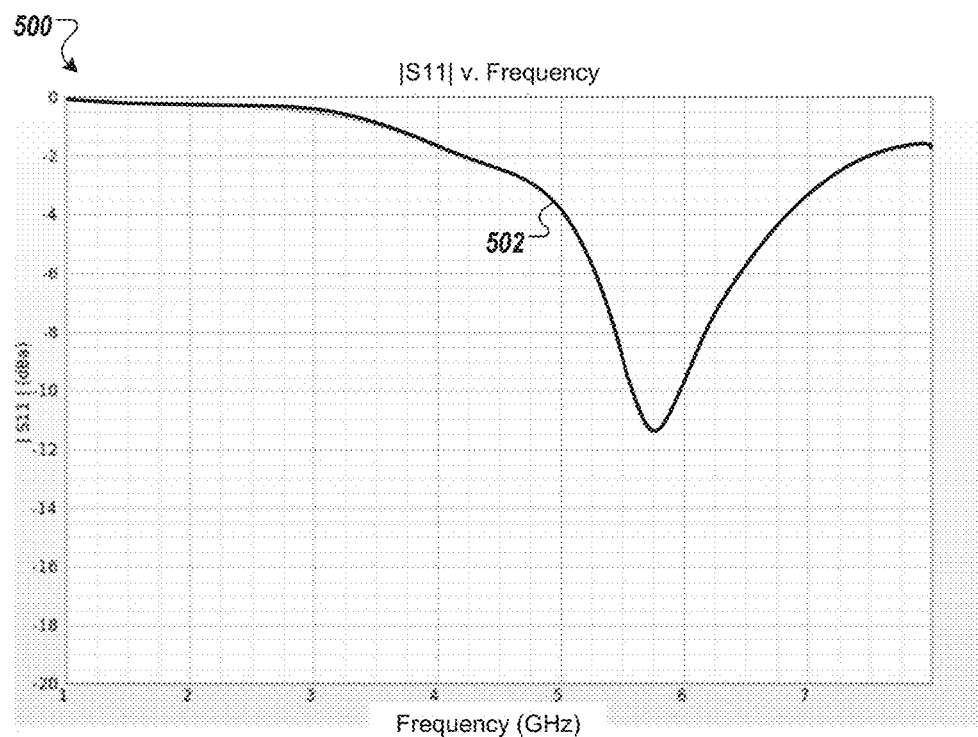
FIG. 5 is a graph of return loss of a self-resonance of the pattern diversity assisted SISO antenna of FIG. 2 in a first mode according to one embodiment.

FIG. 5 is a graph 500 of return loss of a self-resonance of the pattern diversity assisted SISO antenna 200 of FIG. 2 in a first mode according to one embodiment. The graph 500 shows the return loss 502 of the pattern diversity assisted SISO antenna 200 in the first mode (e.g., loop mode). The graph 500 illustrates that the pattern diversity assisted SISO antenna 200 self-resonates at approximately 5.8 GHz the first resonant mode (e.g., loop mode).

Figure 6:
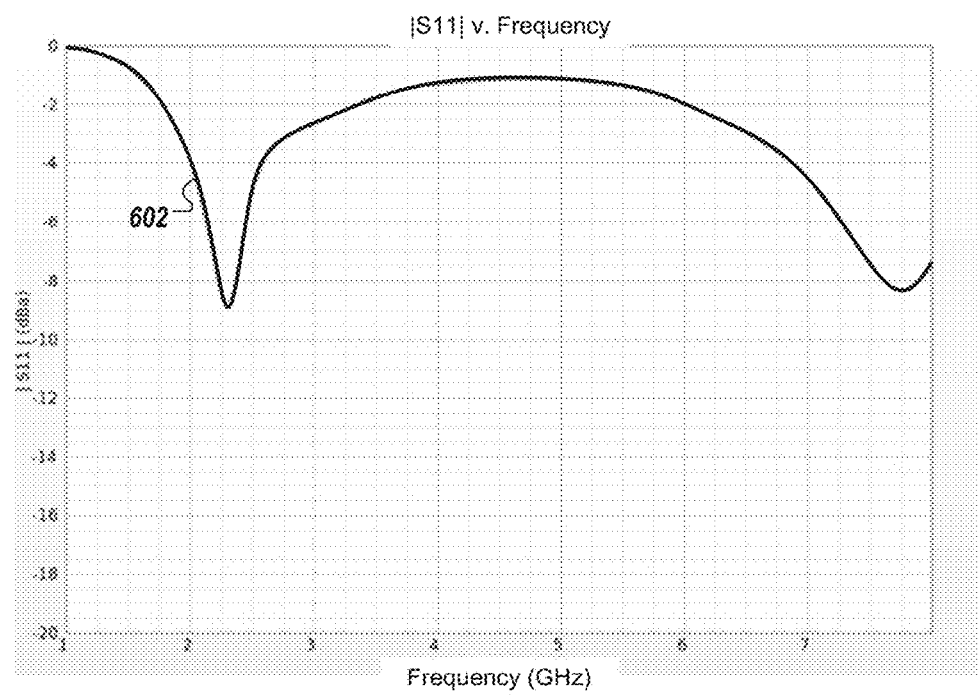
FIG. 6 is a graph of return loss of a self-resonance of the pattern diversity assisted SISO antenna of FIG. 2 in a second mode according to one embodiment.

FIG. 6 is a graph 600 of return loss of a self-resonance of the pattern diversity assisted SISO antenna of FIG. 2 in a second mode according to one embodiment. The graph 600 shows the return loss 602 of the pattern diversity assisted SISO antenna 200 in the second mode (e.g., monopole mode). The graph 600 illustrates that the pattern diversity assisted SISO antenna 200 self-resonates at approximately 2.4 GHz the second resonant mode (e.g., monopole mode).

Figure 7:
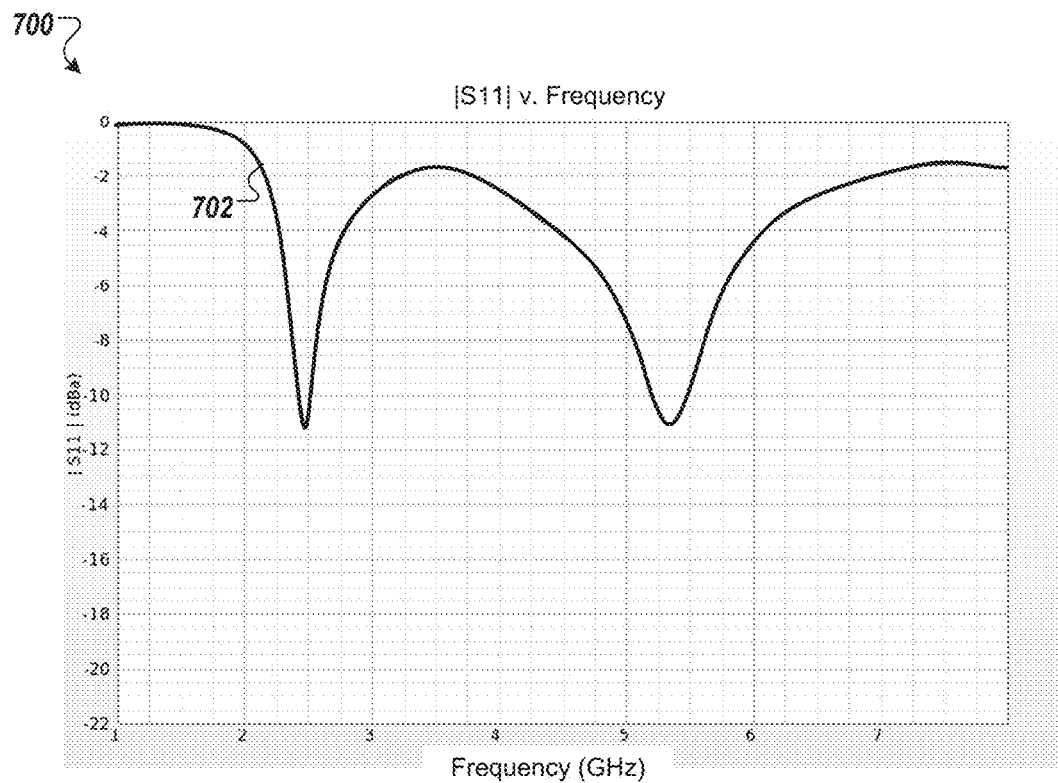
FIG. 7 is a graph of return loss of the pattern diversity assisted SISO antenna of FIG. 2 matched to dual-band WLAN frequency ranges in a first mode according to one embodiment.
Figure 8:
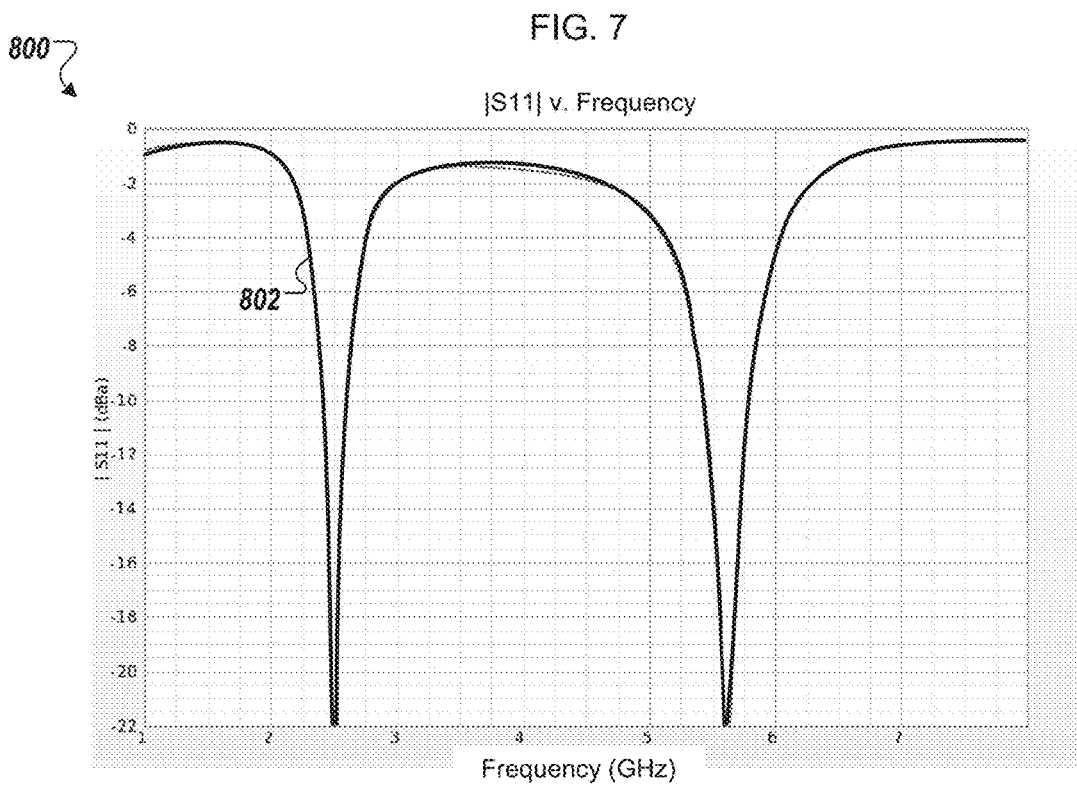
FIG. 8 is a graph of return loss of the pattern diversity assisted SISO antenna of FIG. 2 matched to the dual-band WLAN frequency ranges in a second mode according to one embodiment.

As described above, the two modes can be matched to desired working bands of interested, such as the 2.4 GHz and 5 GHz frequency bands, as illustrated in FIGS. 7-8. In one embodiment, the first mode is matched using a first impedance matching circuit in the RF circuitry 240 and the second modes is matched using a second impedance matching circuit. In another embodiment, a single impedance matching circuit can be used to match both the first mode and the second mode. The impedance matching circuits operate to match an impedance of a respective antenna to an impedance of a RF circuit coupled to the respective antenna to radiate or receive electromagnetic energy in a specified frequency range.

FIG. 7 is a graph of return loss of the pattern diversity assisted SISO antenna of FIG. 2 matched to dual-band WLAN frequency ranges in a first mode according to one embodiment. The graph 700 shows the return loss 702 of the pattern diversity assisted SISO antenna 200 in the first mode (e.g., loop mode). The graph 700 illustrates that the pattern diversity assisted SISO antenna 200 can be caused to radiate or receive electromagnetic energy in the first mode (e.g., loop mode) in a first frequency range between approximately 4.8 GHz to approximately 6.0 GHz and in a second frequency range between approximately 2.0 GHz to approximately 3.0 GHz. In another embodiment, the second frequency range is between approximately 2.4 GHz to approximately 2.5 GHz. The first mode can be used for the WLAN 2.4 GHz and WLAN 5 GHz frequency bands.

FIG. 8 is a graph of return loss of the pattern diversity assisted SISO antenna of FIG. 2 matched to the dual-band WLAN frequency ranges in a second mode according to one embodiment. The graph 600 shows the return loss 602 of the pattern diversity assisted SISO antenna 200 in the second mode (e.g., monopole mode). The graph 800 illustrates that the pattern diversity assisted SISO antenna 200 can be caused to radiate or receive electromagnetic energy in the second mode (e.g., monopole mode) in the first frequency range between approximately 4.8 GHz to approximately 6.0 GHz and in a second frequency range between approximately 2.0 GHz to approximately 3.0 GHz. The second mode can be used for the WLAN 2.4 GHz and WLAN 5 GHz frequency bands.

Figure 9:
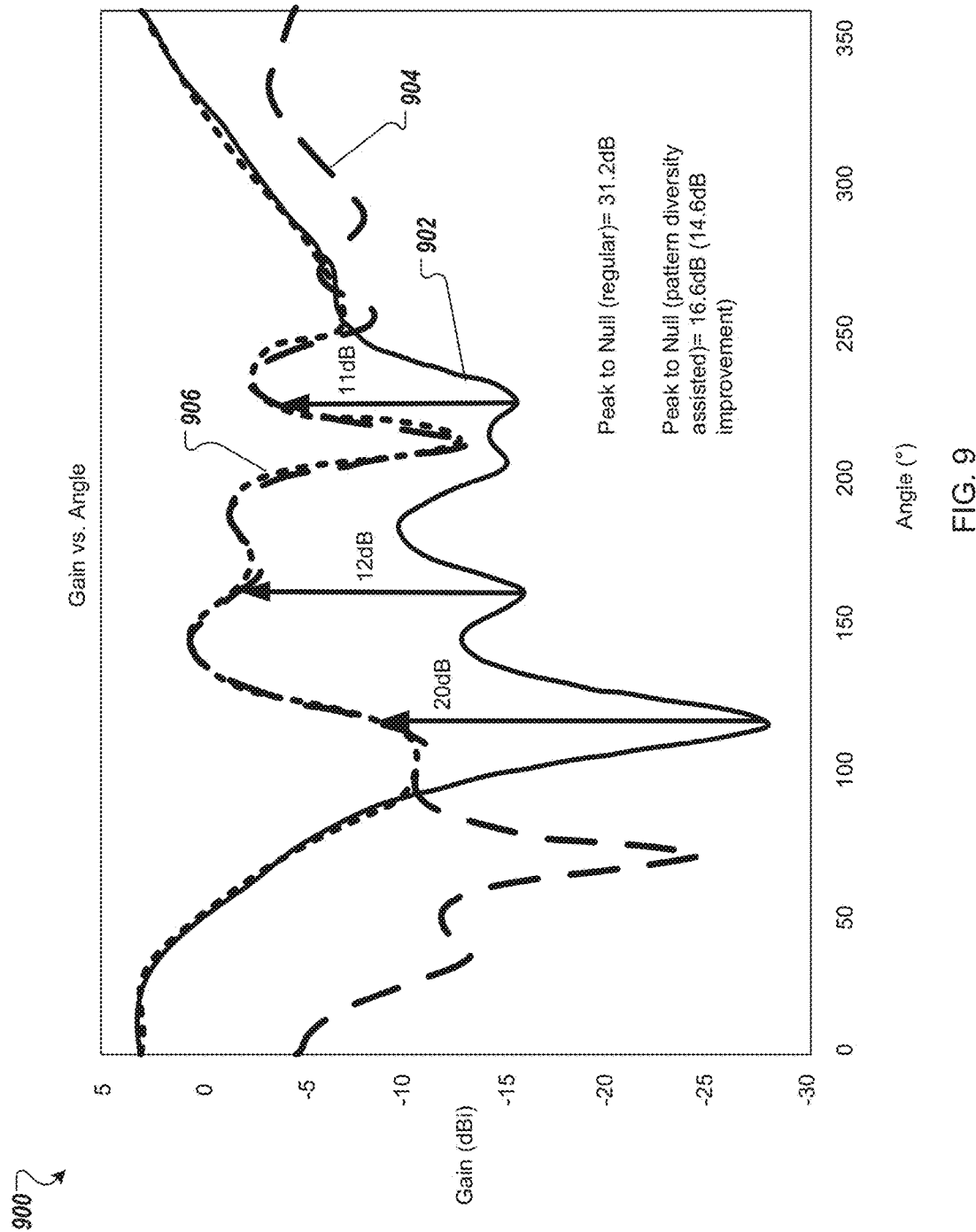
FIG. 9 is a graph illustrating antenna signal strength with respect to azimuth angle for a SISO antenna and a pattern diversity assisted SISO antenna according to one embodiment.

FIG. 9 is a graph 900 illustrating antenna signal strength with respect to azimuth angle for a SISO antenna and a pattern diversity assisted SISO antenna according to one embodiment. The antenna signal strength 902 is the antenna signal strength of the regular SISO antenna (e.g., a loop antenna) without the RF switch to redirect the current flow. The antenna signal strength 902 is also the antenna signal strength of the pattern diversity assisted SISO antenna in the first mode (e.g., loop antenna). However, because the pattern diversity assisted SISO antenna has the RF switch to redirect current follow to achieve another radiation pattern in another mode, an improved effective antenna signal strength 906 can be achieved by the pattern diversity assisted SISO antenna in comparison to the regular SISO antenna. In particular, the antenna signal strength 904 is the antenna strength of the pattern diversity assisted SISO antenna in the second mode (e.g., monopole antenna). As a result, line 906 represents an effective signal strength of the pattern diversity assisted SISO antenna. The RF switch in the first mode is closed and allows the current flow through the pattern diversity assisted SISO antenna to the grounding point as described herein. The RF switch in the second mode is open and the current flow does not pass to the grounding point as described herein. In this embodiment, the peak to null of the antenna signal strength 902 is about 31.2 dB; whereas the peak to null of the effective antenna strength 906 of the pattern diversity assisted SISO antenna is 16.6 dB, which is about 14.6 dB improvement.

Figure 10:
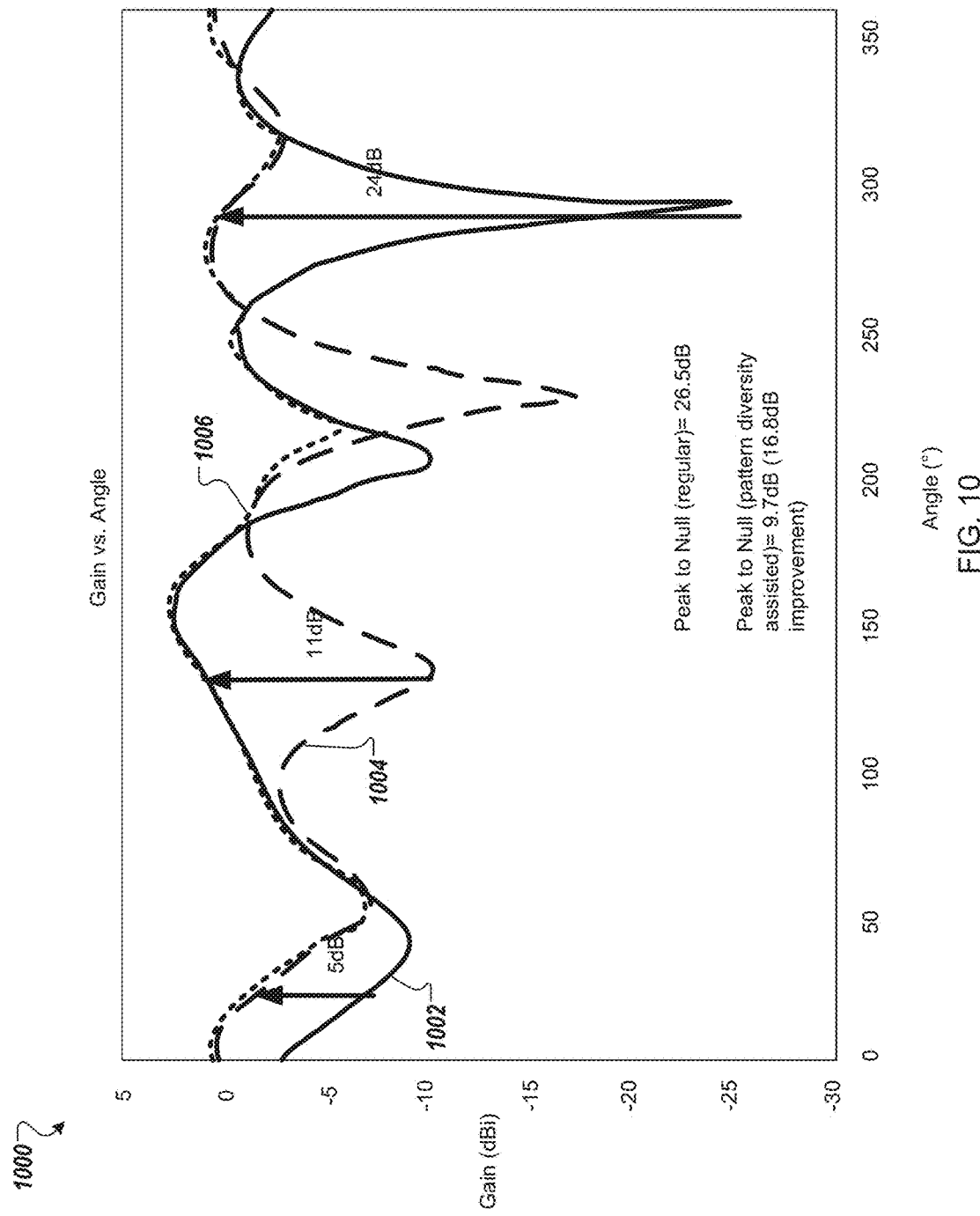
FIG. 10 is a graph illustrating antenna signal strength with respect to azimuth angle for a SISO antenna and a pattern diversity assisted SISO antenna according to one embodiment.

FIG. 10 is a graph 1000 illustrating antenna signal strength with respect to azimuth angle for a SISO antenna and a pattern diversity assisted SISO antenna according to one embodiment. The antenna signal strength 1002 is the antenna strength of the regular SISO antenna (e.g., a monopole antenna) without the RF switch to redirect the current flow. The antenna signal strength 1002 is also the antenna signal strength of the pattern diversity assisted SISO antenna in the second mode (e.g., monopole antenna). However, because the pattern diversity assisted SISO antenna has the RF switch to redirect current follow to achieve another radiation pattern in another mode, an improved effective antenna signal strength 1006 can be achieved by the pattern diversity assisted SISO antenna in comparison to the regular SISO antenna. The antenna signal strength 1004 is the antenna strength of the pattern diversity assisted SISO antenna in the first mode (e.g., loop antenna). As a result, line 1006 represents an effective signal strength of the pattern diversity assisted SISO antenna. The RF switch in the second mode is open and the current flow does not pass to the grounding point as described herein. The RF switch in the first mode is closed and allows the current flow through the pattern diversity assisted SISO antenna to the grounding point as described herein. In this embodiment, the peak to null of the antenna signal strength 1002 is about 26.5 dB; whereas the peak to null of the effective antenna strength 1006 of the pattern diversity assisted SISO is 9.7 dB, which is about 16.8 dB improvement.

Figure 11:
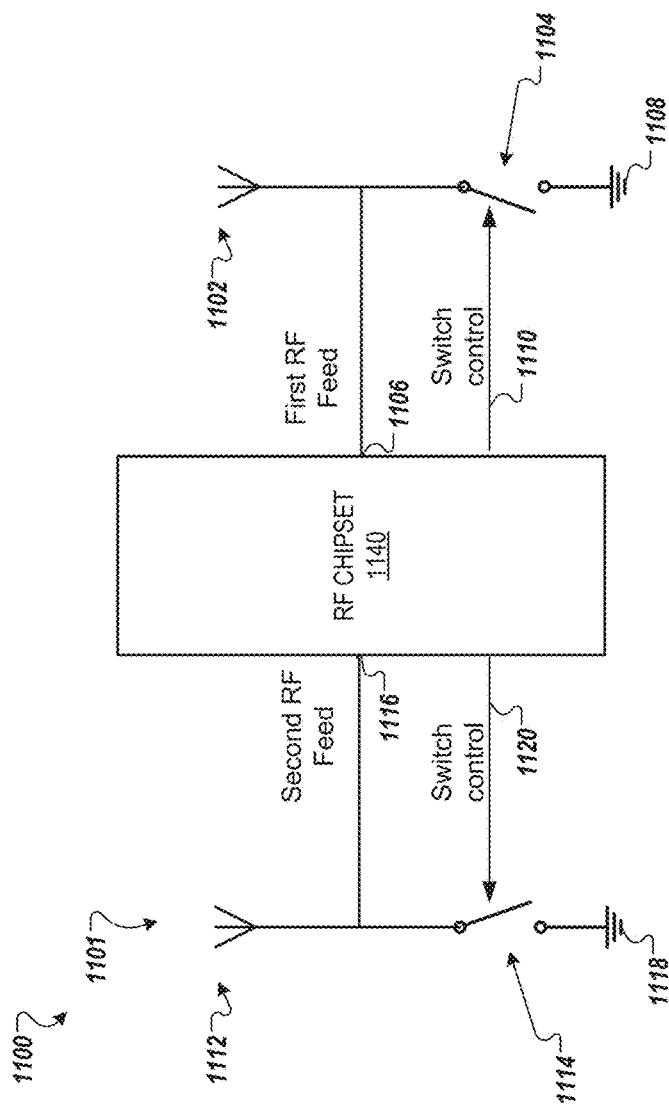
FIG. 11 is a block diagram of an antenna architecture of a user device with a pattern diversity assisted MIMO antenna according to one embodiment.

FIG. 11 is a block diagram of an antenna architecture of a user device 1100 with a pattern diversity assisted MIMO antenna 1101 according to one embodiment. The user device 1100 includes a RF chipset 1140 (also referred to herein as RF circuit and RF circuitry), a first RF feed 1106, a second RF feed 1116, and two antenna elements 1102, 1112 of the pattern diversity assisted MIMO antenna 1101. The pattern diversity assisted MIMO antenna 1101 includes a first antenna element 1102, a first RF switch 1104, a second antenna element 1112, and a second RF switch 1114. The first antenna element 1102 is self-resonant at a first frequency in a first mode and at a second frequency in a second mode. A first end of the first antenna element 1102 is coupled to the first RF feed 1106. The first RF switch 1104 is coupled between the first antenna element 1102 and a first grounding point 1108, such as on a ground plane. The RF chipset 1140 is operable to control the first RF switch 1104 to switch the first antenna element 1102 between the first mode and the second mode. The RF chipset 1140 may control the first RF switch 1104 using a first switch control signal 1110. The RF chipset 1140 is also operable to cause the first antenna element 1102 to radiate or receive electromagnetic energy in a first radiation pattern in the first mode and to radiate or electromagnetic energy in a second radiation pattern in the second mode. The second antenna element 1112 is self-resonant at a third frequency in a third mode and at a fourth frequency in a fourth mode. A first end of the second antenna element 1112 is coupled to the second RF feed 1116. The second RF switch 1114 is coupled between the second antenna element 1112 and a second grounding point 1118, such as on a ground plane. The RF chipset 1140 is operable to control the second RF switch 1114 to switch the second antenna element 1112 between the third mode and the fourth mode. The RF chipset 1140 may control the second RF switch 1114 using a second switch control signal 1120. The RF chipset 1140 is also operable to cause the second antenna element 1112 to radiate or receive electromagnetic energy in a third radiation pattern in the third mode and to radiate or electromagnetic energy in a fourth radiation pattern in the fourth mode. It should also be noted that the first antenna element 1102 and the second antenna element 1112 may operate concurrently, resulting in four different mode combinations. For example, the first mode may be a loop-loop mode in which the first antenna element 1102 operates as a first loop antenna and the second antenna element 1112 operates as a second loop antenna. The second mode may be a monopole-monopole mode in which the first antenna element 1102 operates as a first monopole antenna and the second antenna element 1112 operates as a second monopole antenna. The third mode may be a loop-monopole mode in which the first antenna element 1102 operates as the first loop antenna and the second antenna element 1112 operates as the second monopole antenna. The fourth mode is a monopole-loop mode in which the first antenna element 1102 operates as the first monopole antenna and the second antenna element 1112 operates as the second loop antenna.

In one embodiment, the first RF switch 1104 and the second RF switch 1114 are SPST switches. The first RF switch 1104 is coupled between the first antenna element 1102 and the first grounding point 1108. The second RF switch 1114 is coupled between the second antenna element 1112 and the second grounding point 1118. The RF chipset 1140 is operable to control the first SPST switch between a closed state and an open state using the first switch control signal 1110, and control the second SPST switch between a closed state and an open state using the second switch control signal 1120. The RF switch 1104 redirects current flow applied on the first antenna element 1102 by the first RF feed 1106 and the RF switch 1114 redirects current flow applied on the second antenna element 1112 by the second RF feed 1116. For example, the RF chipset 1140 causes a first current flow on the first antenna element 1102 to achieve a first radiation pattern of electromagnetic energy in a first resonant mode when the first SPST switch is in the closed state and causes a second current flow on the first antenna element 1102 to achieve a second radiation pattern of electromagnetic energy in a second resonant mode when the first SPST switch is in the open state. The RF chipset 1140 causes a third current flow on the second antenna element 1112 to achieve a third radiation pattern of electromagnetic energy in a third resonant mode when the second SPST switch is in the closed state and causes a fourth current flow on the second antenna element 1112 to achieve a fourth radiation pattern of electromagnetic energy in a fourth resonant mode when the second SPST switch is in the open state. The second radiation pattern may be different than the first radiation pattern and the fourth radiation pattern may be different than the third radiation pattern. Alternatively, the four radiation patterns are all different. Even though in some modes, both antenna elements operate as loop antennas or both monopole antennas, the radiation patterns may be different due to the locations of the first and second antenna elements 1102, 1112.

In one embodiment, the first antenna element 1102 is self-resonant at approximately 5.5 GHz when the first SPST switch is in the closed state, and the first antenna element 1102 is self-resonant at approximately 2.4 GHz when the first SPST switch is in the open state. In a further embodiment, the second antenna element 1112 is self-resonant at approximately 5.5 GHz when the second SPST switch is in the closed state, and the second antenna element 1112 is self-resonant at approximately 2.4 GHz when the second SPST switch is in the open state.

In one embodiment, the RF chipset 1140 includes a WLAN module operable to cause the first antenna element 1102 to radiate or receive electromagnetic energy in a first frequency range (e.g., approximately 4.8 GHz and approximately 6.0 GHz) in the first mode and in a second frequency range (e.g., approximately 2.4 GHz and approximately 2.5 GHz) in the second mode. The WLAN module may also cause the second antenna element 1112 to radiate or receive electromagnetic energy in a third frequency range (e.g., approximately 4.8 GHz and approximately 6.0 GHz) in the third mode and in a fourth frequency range (e.g., approximately 2.4 GHz and approximately 2.5 GHz) in the fourth mode. As described above, the first antenna element 1102 may be designed to be self-resonant at 5.5 GHz for the first mode (e.g., a loop mode) and at 2.4 GHz for the second mode (e.g., a monopole mode). These modes can be further matched to desired working bands of interest. For example, in dual-band Wi-Fi® networks, the antenna element 1102 can be matched in the two modes to cover the 2.4 GHz band and the 5 GHz band. Similarly, the second antenna element 1112 may be matched to desired working bands of interest in the two modes.

In another embodiment, the RF chipset 1140 is operable to cause: in the first mode, the first antenna element 1102 to radiate or receive electromagnetic energy in the first frequency range and the second antenna element 1112 to radiate or receive electromagnetic energy in the third frequency range; in the second mode, the first antenna element 1102 to radiate or receive electromagnetic energy in the second frequency range and the second antenna element 1112 to radiate or receive electromagnetic energy in the fourth frequency range; in the third mode, the first antenna element to radiate or receive electromagnetic energy in the first frequency range and the second antenna element to radiate or receive electromagnetic energy in the fourth frequency range; and in the fourth mode, the first antenna element to radiate or receive electromagnetic energy in the second frequency range and the second antenna element to radiate or receive electromagnetic energy in the third frequency range. In one embodiment, the first frequency range and the third frequency range are between approximately 4.8 GHz and approximately 6.0 GHz and the second frequency range and the fourth frequency range are between approximately 2.4 GHz and approximately 2.5 GHz. Alternatively, other frequencies for the four frequency ranges may be achieved with other antenna structures.

The user device 1100 (also referred to herein as an electronic device) may be any content rendering device that includes a modem for connecting the user device to a network. Examples of such electronic devices include electronic book readers, portable digital assistants, mobile phones, laptop computers, portable media players, tablet computers, cameras, video cameras, netbooks, notebooks, desktop computers, gaming consoles, Blu-ray® or DVD players, media centers, drones, and the like. The user device may connect to a network to obtain content from a server computing system (e.g., an item providing system) or to perform other activities. The user device may connect to one or more different types of cellular networks.

Figure 12:
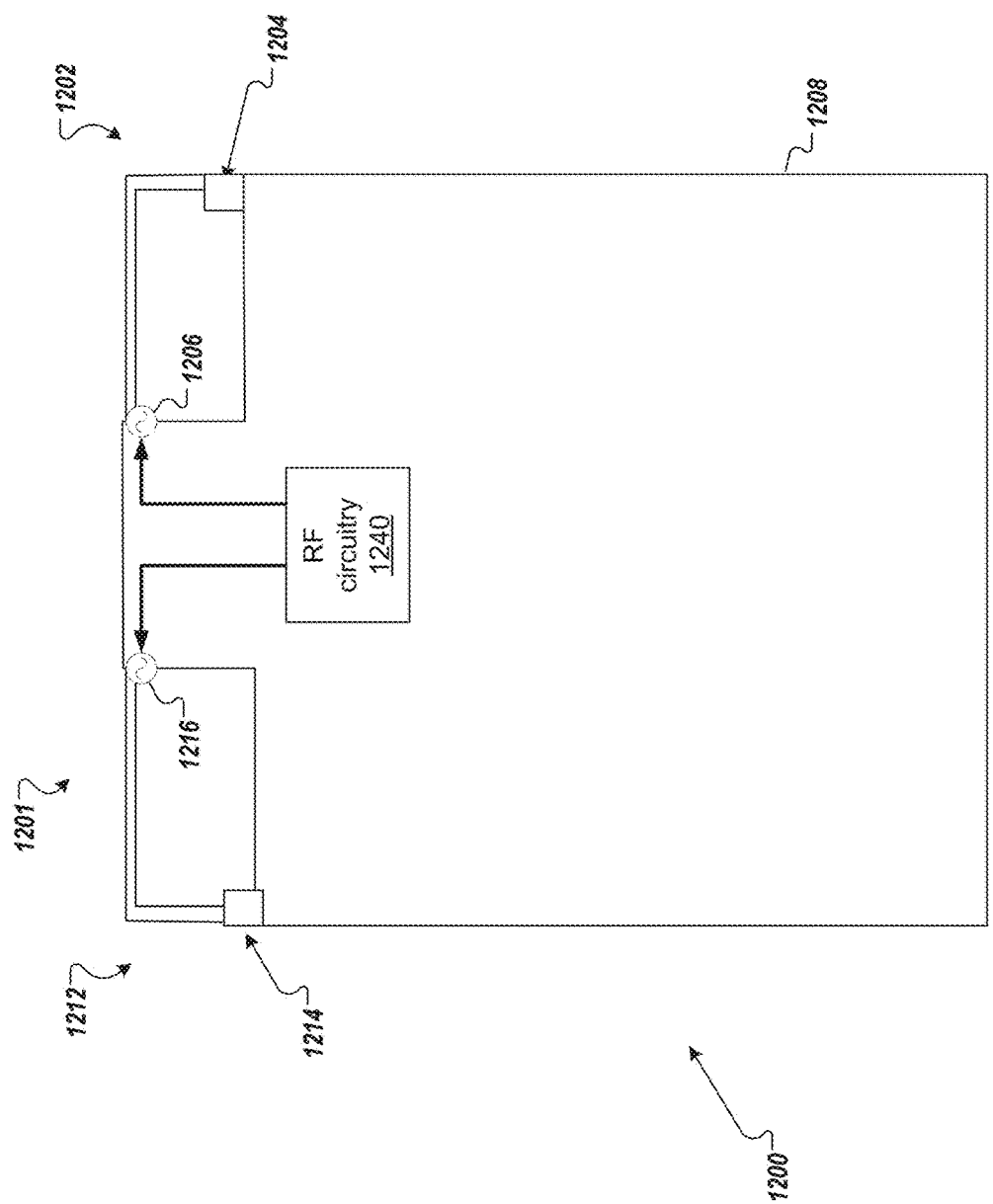
FIG. 12 illustrates a user device with a pattern diversity assisted MIMO antenna according to one embodiment.

FIG. 12 illustrates a user device 1200 with a pattern diversity assisted MIMO antenna 1201 according to one embodiment. The user device 1200 includes the pattern diversity assisted MIMO antenna 1201 with two antenna elements 1202 and 1212, a first RF feed 1206, a second RF feed 1216, RF circuitry 1240, and ground plane 1208. The pattern diversity assisted MIMO antenna 1201 includes a first antenna element 1202 and a second antenna element 1212. The first antenna element 1202 includes a first arm coupled to the first RF feed 1206 at a first end. The first arm extends in a first direction from the first RF feed 1206 to a first fold at a second end of the first arm. A second arm is coupled to the second end of the first arm at the first fold. The second arm extends in a second direction from a first end of the second arm at the first fold to a second end of the second arm. The second antenna element 1212 includes a third arm coupled to the second RF feed 1216 at a first end of the third arm, the third arm extending in a third direction from the second RF feed 1216 to a second fold at a second end of the third arm. A fourth arm is coupled to the second end of the third arm at the second fold, the fourth arm extending in the second direction from a first end of the fourth arm at the second fold to a second end of the fourth arm.

The pattern diversity assisted MIMO antenna 1201 also includes a first RF switch 1204 coupled between the second arm of the first antenna element 1202 and a first grounding point on the ground plane 1208. The pattern diversity assisted MIMO antenna 1201 also includes a second RF switch 1214 coupled between the fourth arm of the second antenna element 1212 and a second grounding point on the ground plane 1208. The RF switch 1204 and the RF switch 1214 may be SPST switch.

The RF circuitry 1240 is operable to control the first RF switch 1204 and the second RF switch 1214 to switch the pattern diversity assisted MIMO antenna 1201 between the four modes. The RF circuitry 1240 may control the first RF switch 1204 using a first switch control signal (not illustrated in FIG. 12) and may control the second RF switch 1214 using a second switch control signal (not illustrated in FIG. 12). Alternatively, other components can control the state of the first RF switch 1204 and the second RF switch 1214. The RF circuitry 1240 is also operable to cause the pattern diversity assisted MIMO antenna 1201 to radiate or receive electromagnetic energy in a first radiation pattern in the first mode, to radiate or electromagnetic energy in a second radiation pattern in the second mode, to radiate or receive electromagnetic energy in a third radiation pattern in the third mode, and to radiate or receive electromagnetic energy in a fourth radiation pattern. The first, second, third and fourth radiation patterns are different radiation patterns. In a further embodiment, the first antenna element 1202 operates as a first loop antenna when the first SPST switch 1204 is in the closed state and the second antenna element 1212 operates as a second loop antenna when the second SPST switch 1214 is in the closed state. The first antenna element 1202 operates as a first monopole antenna when the first SPST switch 1204 is in the open state and the second antenna element 1212 operates as a second monopole antenna when the second SPST switch 1214 is in the open state.

Figure 13:
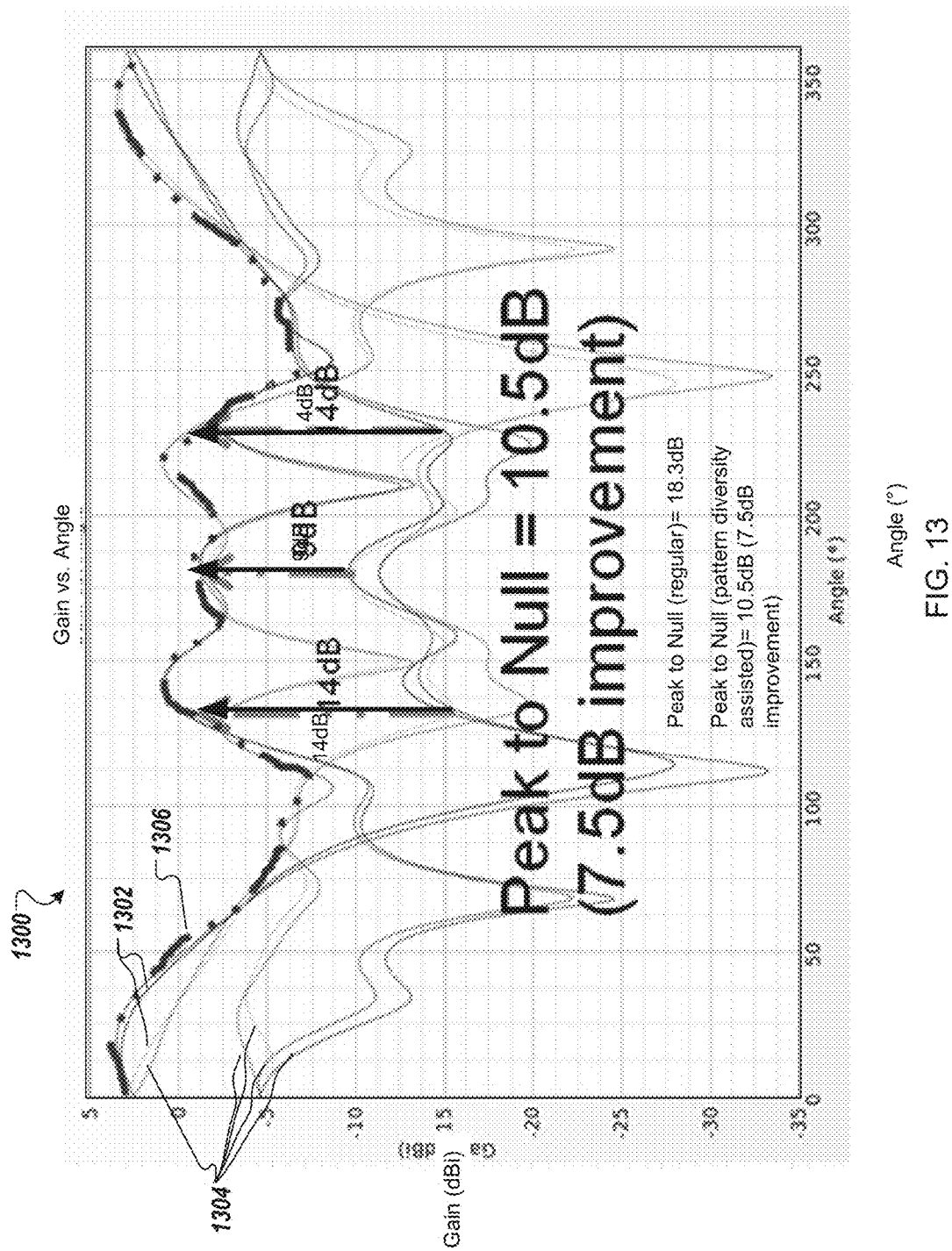
FIG. 13 illustrate antenna signal strength with respect to azimuth angle for a MIMO antenna and a pattern diversity assisted MIMO antenna at a first frequency according to one embodiment.

FIG. 13 illustrate antenna signal strength with respect to azimuth angle for a MIMO antenna and a pattern diversity assisted MIMO antenna at a first frequency according to one embodiment. The antenna signal strength 1302 is the antenna strengths of the two antenna elements of the regular MIMO antenna without the RF switches to redirect the current flows in the four modes described above. The antenna signal strength 1302 is also the antenna signal strength of the pattern diversity assisted MIMO antenna at the first frequency range. However, because the pattern diversity assisted MIMO antenna has the RF switches to redirect current follows to achieve additional radiation patterns in other modes, an improved effective antenna signal strength 1306 can be achieved by the pattern diversity assisted MIMO antenna in comparison to the regular MIMO antenna. In particular, the antenna signal strengths 1304 are the antenna strengths of the two antenna elements of the pattern diversity assisted MIMO antenna at the first frequency of 5.8 GHz in other modes. As a result, line 1306 represents an effective signal strength of the pattern diversity assisted MIMO antenna at 5.8 GHz. In this embodiment, the peak to null of the antenna signal strength 1302 at 5.8 GHz is about 18.3 dB; whereas the peak to null of the effective antenna signal strengths 1306 of the pattern diversity assisted MIMO antenna at 5.8 GHz is 10.5 dB, which is about 7.5 dB improvement.

Figure 14:
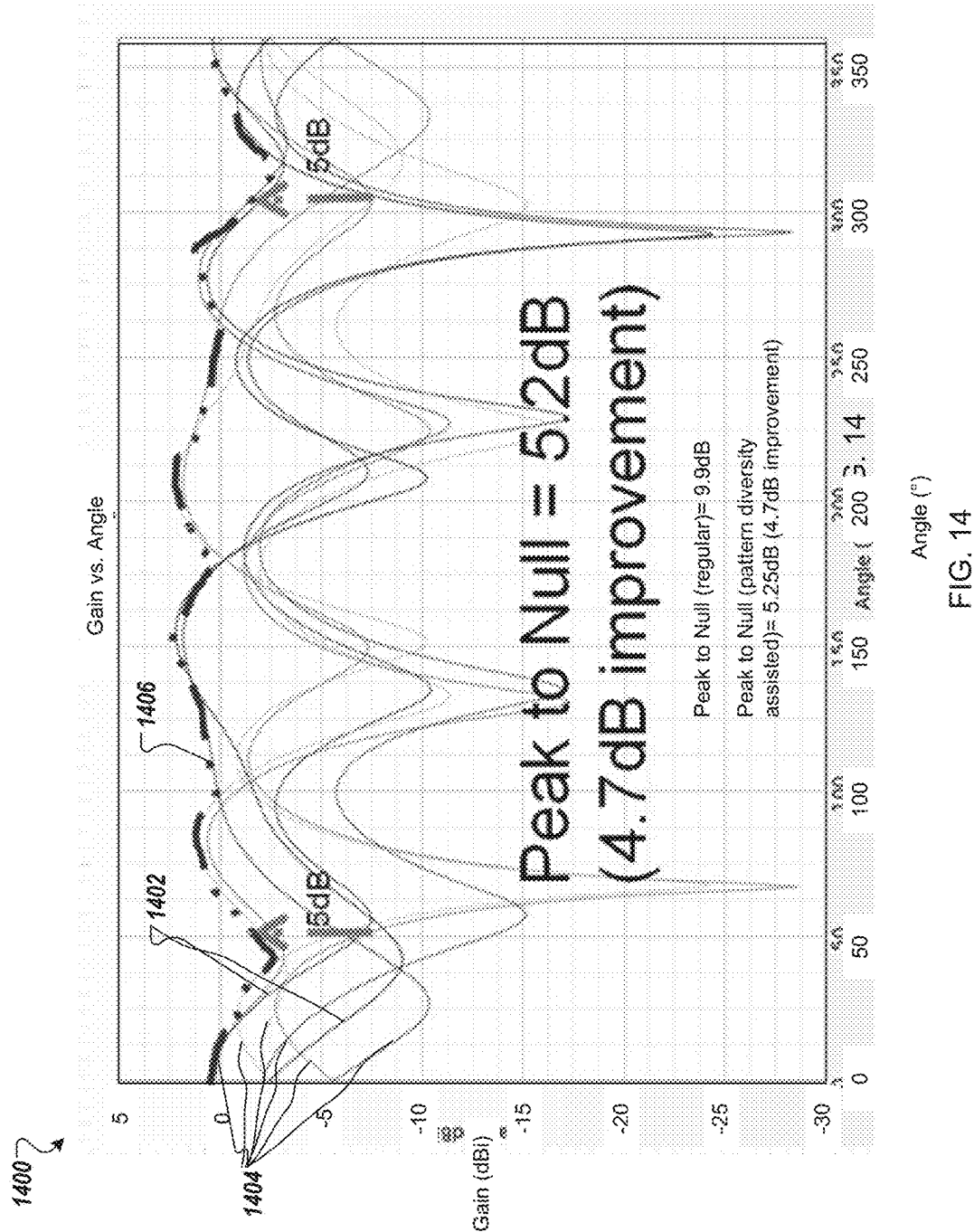
FIG. 14 illustrate antenna signal strength with respect to azimuth angle for a MIMO antenna and a pattern diversity assisted MIMO antenna at a second frequency according to one embodiment.

FIG. 14 illustrate antenna signal strength with respect to azimuth angle for a MIMO antenna and a pattern diversity assisted MIMO antenna at a second frequency according to one embodiment. The antenna signal strength 1402 is the antenna strengths of the two antenna elements of the regular MIMO antenna without the RF switches to redirect the current flows in the four modes described above. The antenna signal strength 1402 is also the antenna signal strength of the pattern diversity assisted MIMO antenna at the second frequency range. However, because the pattern diversity assisted MIMO antenna has the RF switches to redirect current follows to achieve additional radiation patterns in other modes, an improved effective antenna signal strength 1406 can be achieved by the pattern diversity assisted MIMO antenna in comparison to the regular MIMO antenna. In particular, the antenna signal strengths 1404 are the antenna strengths of the two antenna elements of the pattern diversity assisted MIMO antenna at the second frequency of 2.45 GHz in other modes. As a result, line 1406 represents an effective signal strength of the pattern diversity assisted MIMO antenna at 2.45 GHz. In this embodiment, the peak to null of the antenna signal strength 1402 at 5.8 GHz is about 9.9 dB; whereas the peak to null of the effective antenna signal strengths 1406 of the pattern diversity assisted MIMO antenna at 2.45 GHz is 5.2 dB, which is about 4.7 dB improvement.

Figure 15:
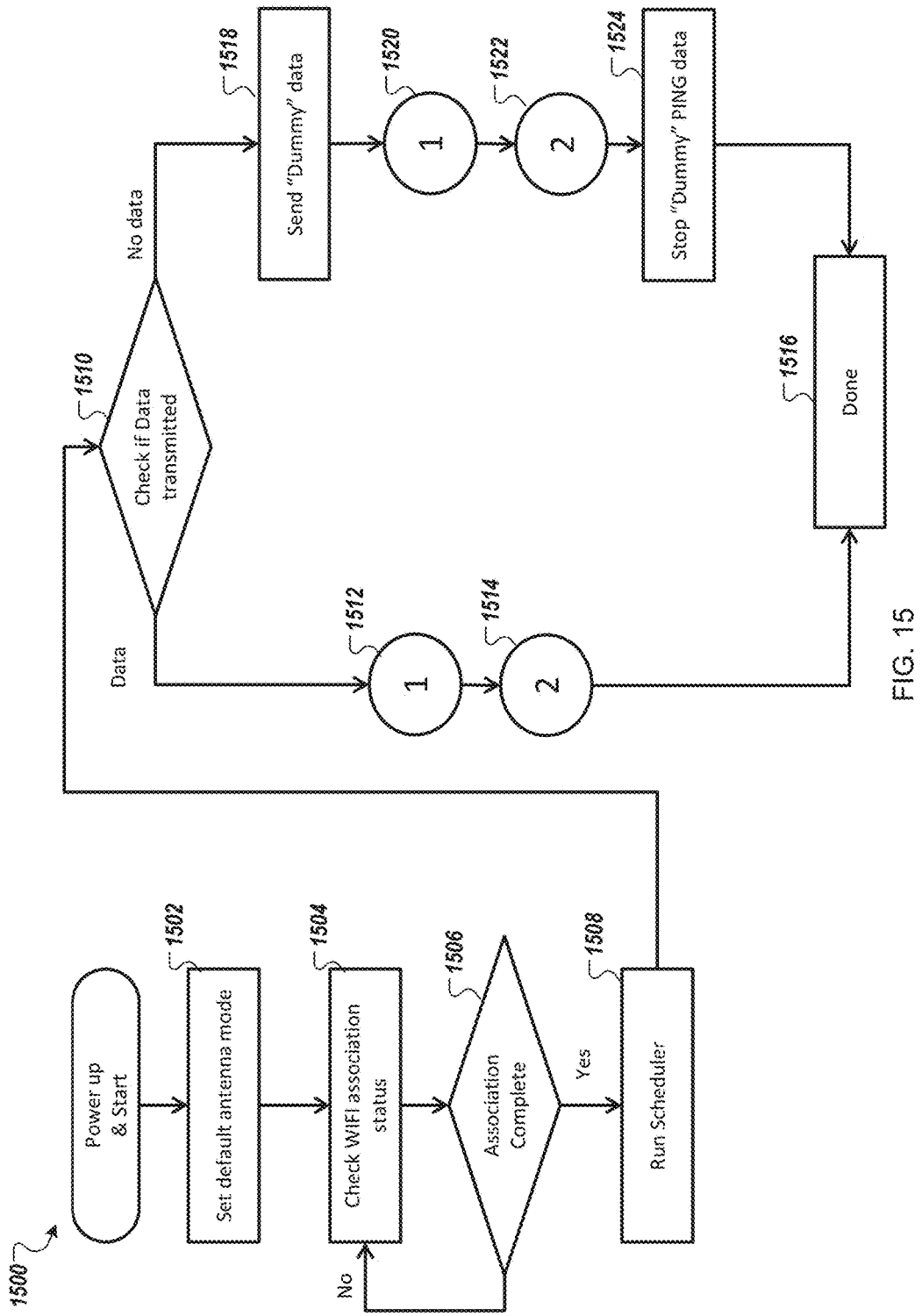
FIG. 15 is a flow diagram of a method of switching between modes of a pattern diversity assisted antenna according to one embodiment.

FIG. 15 is a flow diagram of a method 1500 of switching between modes of a pattern diversity assisted antenna according to one embodiment. Method 1500 may be performed by processing logic that may comprise hardware (e.g., circuitry, dedicated logic, programmable logic, microcode, etc.), software (such as instructions running on the processor), firmware or a combination thereof. In one embodiment, a processor of the user device 100, 200, 1100, or 1200 performs the method 1500. Alternatively, other components of the user device may perform some or all of the operations of the method 1500.

Referring to FIG. 15, the method 1500 begins by the processing logic setting a default antenna mode at power up and start (block 1502). The processing logic checks WIFI association status (block 1504). The processing logic determines if the WIFI association is complete (block 1506). If the association is not complete, the processing logic returns to block 1504. When the association is complete at block 1506, the processing logic runs a schedule (block 1508). At block 1510, the processing logic determines if data is being transmitted. If data is being transmitted, the processing logic performs various operations at blocks 1512 and 1514 to perform mode selections routines, such as those illustrated and described below with respect to FIGS. 16-17. After block 1514, the processing logic is done at block 1516. However, if at block 1510 it is determined that no data is being transmitted, the processing logic sends dummy data at block 1518, and then performs various operations at blocks 1512 and 1514 to perform mode selection routines with the dummy data. After block 1522, the processing logic stops sending dummy data at block 1524, and the processing logic is done at block 1516.

Figure 16:
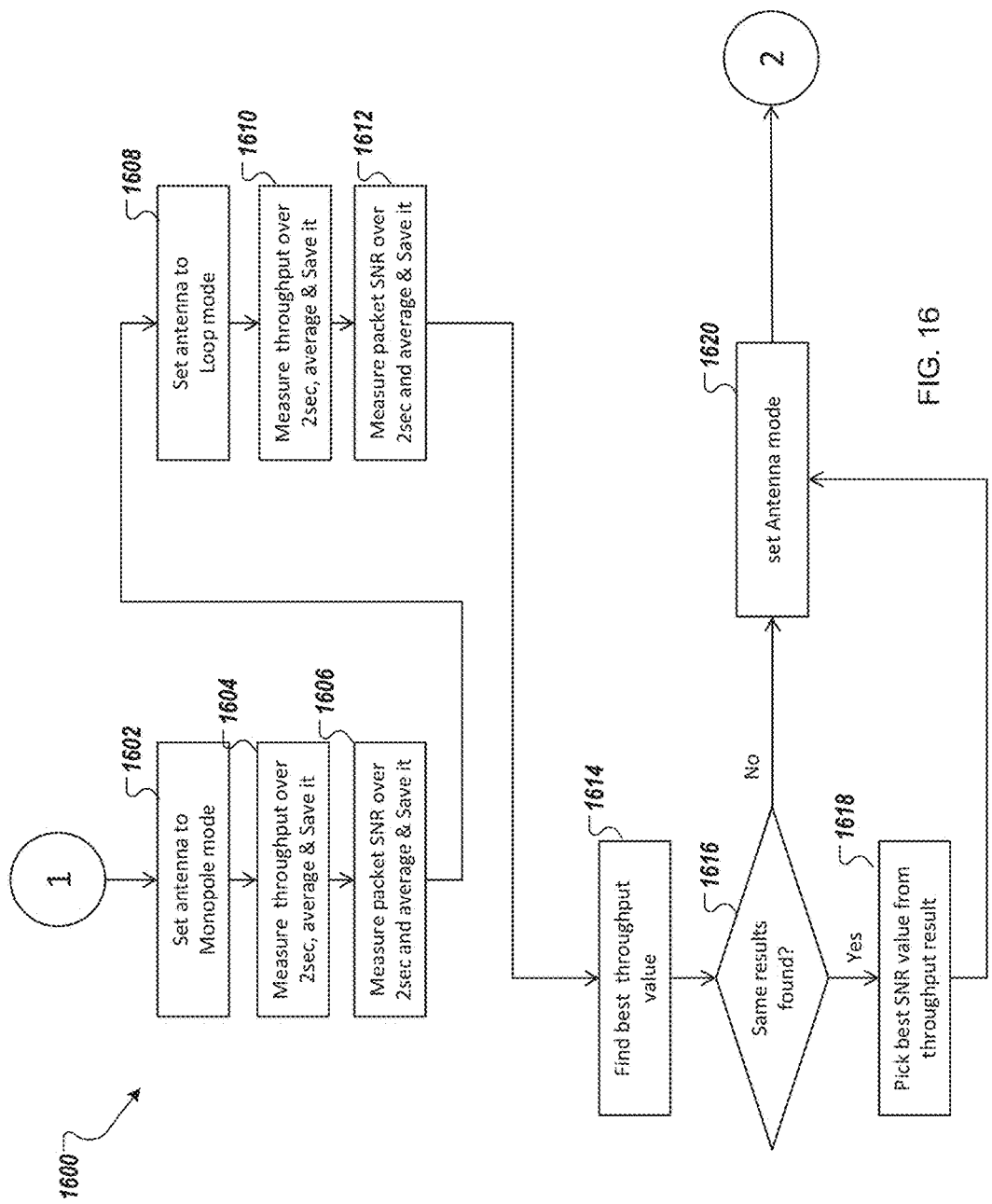
FIG. 16 is a flow diagram of a method of switching between two modes of a pattern diversity assisted SISO antenna according to one embodiment.

FIG. 16 is a flow diagram of a method 1600 of switching between two modes of a pattern diversity assisted SISO antenna according to one embodiment. Method 1600 may be performed by processing logic that may comprise hardware (e.g., circuitry, dedicated logic, programmable logic, microcode, etc.), software (such as instructions running on the processor), firmware or a combination thereof. In one embodiment, a processor of the user device 100, 200, 1100, or 1200 performs the method 1600. Alternatively, other components of the user device may perform some or all of the operations of the method 1600.

Referring to FIG. 16, the method 1600 begins by the processing logic setting the antenna (single antenna element) to a monopole mode (block 1602). The processing logic measures throughput over a period (e.g., two seconds), takes an average and saves the average to memory (block 1604). The processing logic measures packet signal-to-noise (SNR) over the period, averages the packet SNR and saves it (block 1606). The processing logic sets the antenna to a loop mode (block 1608), measures throughput over the period (e.g., two seconds), takes an average and saves the average to memory (block 1610). The processing logic measures packet SNR over the period, averages the packet SNR and saves it (block 1612). At block 1614, the processing logic determines the best throughput value between the monopole mode and the loop mode. At block 1616, the processing logic determines if the throughput results are the same for monopole mode and the loop mode. If the same results are determined for the loop mode and the monopole mode, the processing logic selects the best SNR value from throughput results (block 1618) and sets the antenna mode accordingly (block 1620).

If the same results are found at block 1616, the processing logic goes directly to block 1620.

Figure 17:
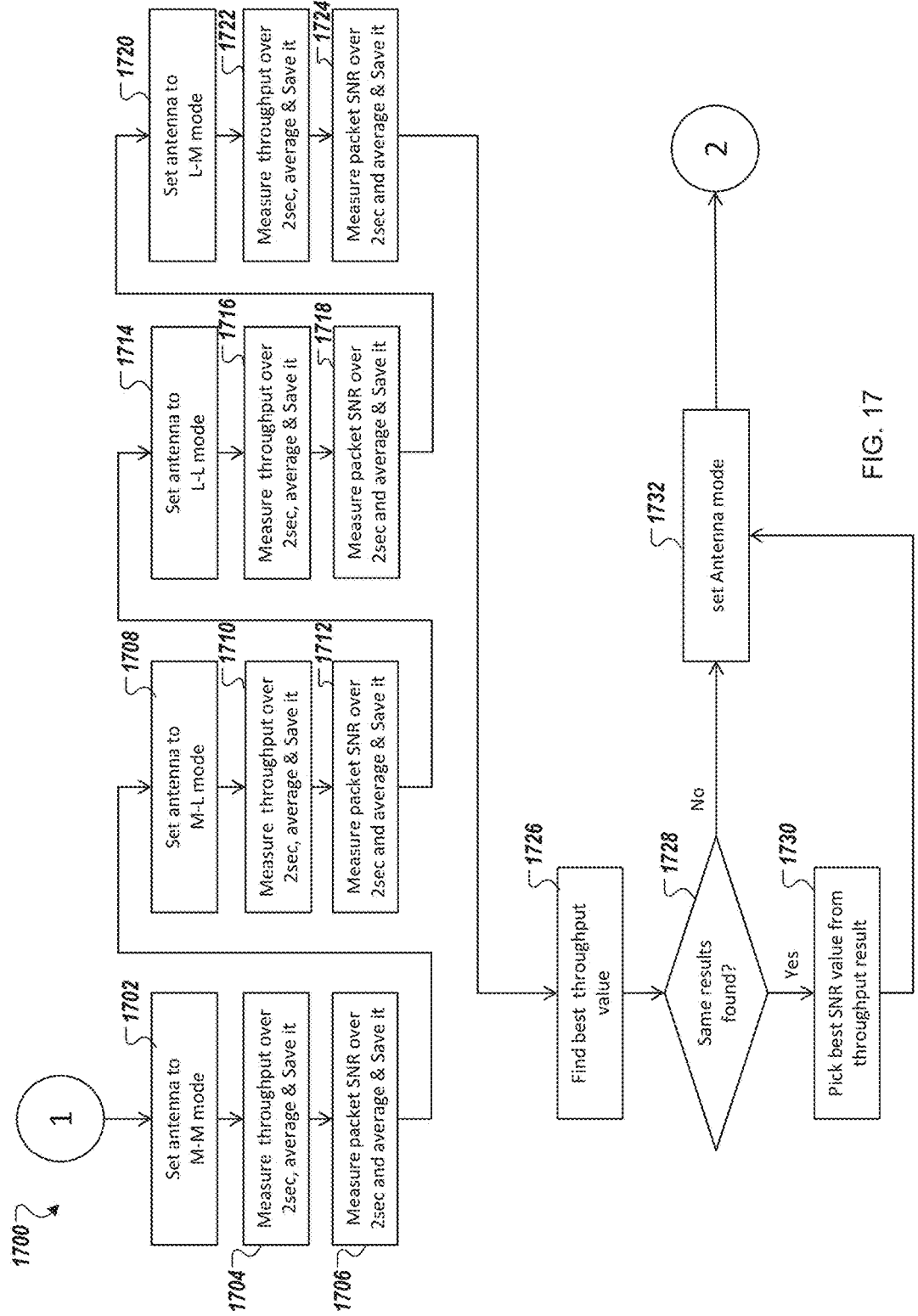
FIG. 17 is a flow diagram of a method of switching between two modes of a pattern diversity assisted MIMO antenna.

FIG. 17 is a flow diagram of a method 1700 of switching between two modes of a pattern diversity assisted MIMO antenna. Method 1700 may be performed by processing logic that may comprise hardware (e.g., circuitry, dedicated logic, programmable logic, microcode, etc.), software (such as instructions running on the processor), firmware or a combination thereof. In one embodiment, a processor of the user device 100, 200, 1100, or 1200 performs the method 1700. Alternatively, other components of the user device may perform some or all of the operations of the method 1700.

Referring to FIG. 17, the method 1700 begins by the processing logic setting the antenna (two antenna elements) to a monopole-monopole (M-M) mode (block 1702). The processing logic measures throughput over a period (e.g., two seconds), takes an average and saves the average to memory (block 1704). The processing logic measures packet SNR over the period, averages the packet SNR and saves it (block 1706). The processing logic sets the antenna to a monopole-loop (M-L) mode (block 1708), measures throughput over the period (e.g., two seconds), takes an average and saves the average to memory (block 1710). The processing logic measures packet SNR over the period, averages the packet SNR and saves it (block 1712). The processing logic setting the antenna to a loop-loop (L-L) mode (block 1714). The processing logic measures throughput over a period (e.g., two seconds), takes an average and saves the average to memory (block 1716). The processing logic measures packet SNR over the period, averages the packet SNR and saves it (block 1718). The processing logic sets the antenna to a loop-monopole (L-M) mode (block 1720), measures throughput over the period (e.g., two seconds), takes an average and saves the average to memory (block 1722). The processing logic measures packet SNR over the period, averages the packet SNR and saves it (block 1724).

At block 1726, the processing logic determines the best throughput value between the four modes. At block 1728, the processing logic determines if the throughput results are the same for four modes. If the same results are determined for the four modes, the processing logic selects the best SNR value from throughput results (block 1730) and sets the antenna mode accordingly (block 1730). If the same results are found at block 1728, the processing logic goes directly to block 1732.

In other embodiments, the other measurements than throughput and packet SNR can be made to determine antenna performance. Also, the order of the measurements can be varied and the order of the selection criteria may also be modified.

Figure 18:
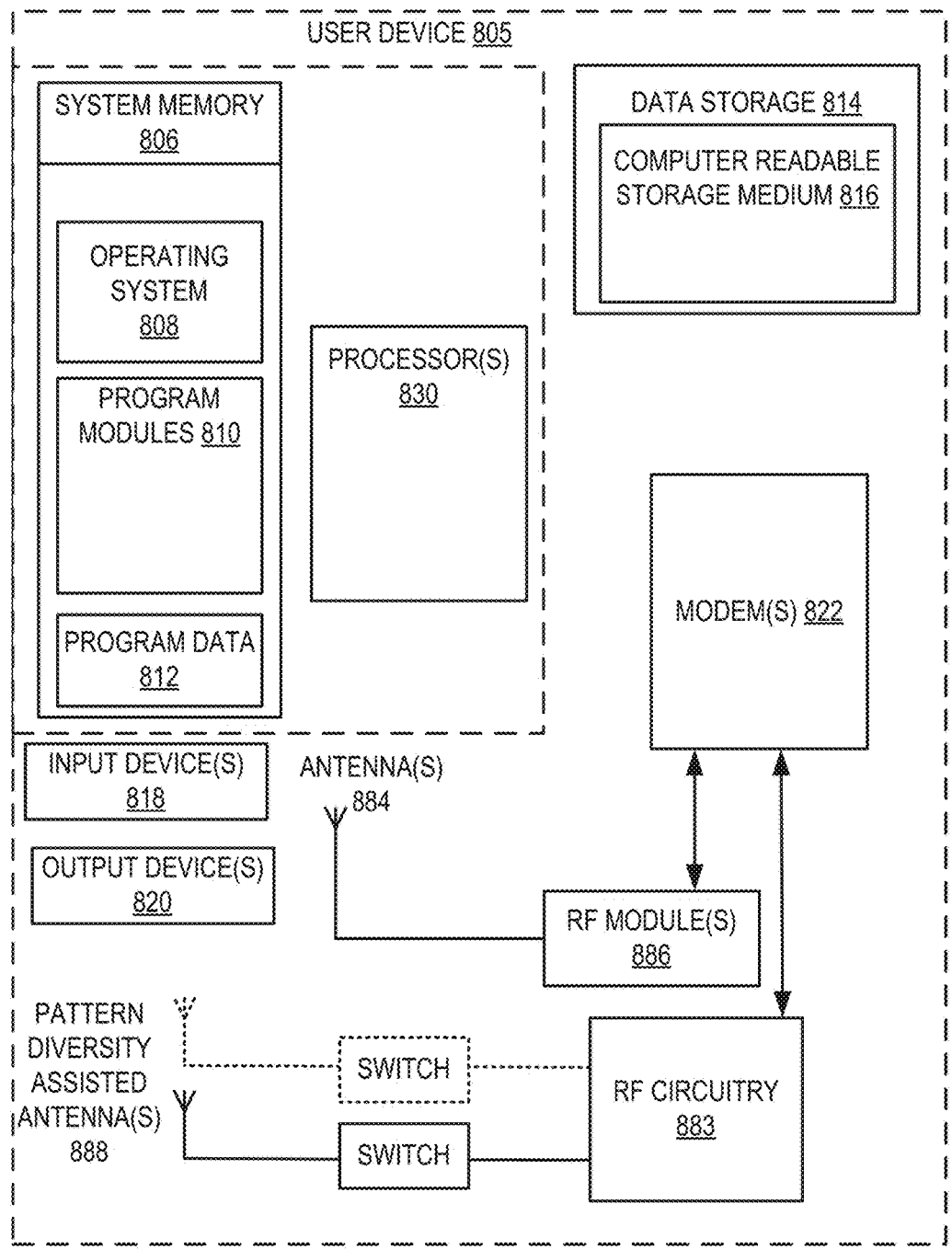
FIG. 18 is a block diagram of a user device in which embodiments of a pattern diversity assisted antenna may be implemented.

FIG. 18 is a block diagram of a user device 1805 in which embodiments of a pattern diversity assisted antenna may be implemented. The user device 1805 may correspond to the user device 1 of FIG. 1, user device 200 of FIG. 2, user device 1100 of FIG. 11, or user device 1200 of FIG. 12. The user device 1805 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 1805 may be any portable or stationary user device. For example, the user device 1805 may be an intelligent voice control and speaker system. Alternatively, the user device 1805 can be any other device used in a WLAN network (e.g., Wi-Fi® network), a WAN network, or the like.

The user device 1805 includes one or more processor(s) 830, such as one or more CPUs, microcontrollers, field programmable gate arrays, or other types of processors. The user device 1805 also includes system memory 806, which may correspond to any combination of volatile and/or non-volatile storage mechanisms. The system memory 806 stores information that provides operating system component 808, various program modules 810, program data 812, and/or other components. In one embodiment, the system memory 806 stores instructions of the methods 1500, 1600, and 1700 as described herein. The user device 1805 performs functions by using the processor(s) 830 to execute instructions provided by the system memory 806.

The user device 1805 also includes a data storage device 814 that may be composed of one or more types of removable storage and/or one or more types of non-removable storage. The data storage device 814 includes a computer-readable storage medium 816 on which is stored one or more sets of instructions embodying any of the methodologies or functions described herein. Instructions for the program modules 810 may reside, completely or at least partially, within the computer-readable storage medium 816, system memory 806 and/or within the processor(s) 830 during execution thereof by the user device 1805, the system memory 806 and the processor(s) 830 also constituting computer-readable media. The user device 1805 may also include one or more input devices 818 (keyboard, mouse device, specialized selection keys, etc.) and one or more output devices 820 (displays, printers, audio output mechanisms, etc.).

The user device 1805 further includes a modem 822 to allow the user device 1805 to communicate via a wireless network (e.g., such as provided by the wireless communication system) with other computing devices, such as remote computers, an item providing system, and so forth. The modem 822 can be connected to RF circuitry 883 and zero or more RF modules 886. The RF circuitry 883 may be a WLAN module, a WAN module, PAN module, or the like. Antennas 888 are coupled to the RF circuitry 883, which is coupled to the modem 822. Zero or more antennas 884 can be coupled to one or more RF modules 886, which are also connected to the modem 822. The zero or more antennas 884 may be GPS antennas, NFC antennas, other WAN antennas, WLAN or PAN antennas, or the like. The modem 822 allows the user device 1805 to handle both voice and non-voice communications (such as communications for text messages, multimedia messages, media downloads, web browsing, etc.) with a wireless communication system. The modem 822 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 822 may generate signals and send these signals to antenna 888, and 884 via RF circuitry 883, and RF module(s) 886 as descried herein. User device 1805 may additionally include a WLAN module, a GPS receiver, a PAN transceiver and/or other RF modules. These RF modules may additionally or alternatively be connected to one or more of antennas 884, 888. Antennas 884, 888 may be configured to transmit in different frequency bands and/or using different wireless communication protocols. The antennas 884, 888 may be directional, omnidirectional, or non-directional antennas. In addition to sending data, antennas 884, 888 may also receive data, which is sent to appropriate RF modules connected to the antennas.

In one embodiment, the user device 1805 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 822 is shown to control transmission and reception via antenna (884, 888), the user device 1805 may alternatively include multiple modems, each of which is configured to transmit/receive data via a different antenna and/or wireless transmission protocol.

The user device 1805 delivers and/or receives items, upgrades, and/or other information via the network. For example, the user device 1805 may download or receive items from an item providing system. The item providing system receives various requests, instructions and other data from the user device 1805 via the network. The item providing system may include one or more machines (e.g., one or more server computer systems, routers, gateways, etc.) that have processing and storage capabilities to provide the above functionality. Communication between the item providing system and the user device 1805 may be enabled via any communication infrastructure. One example of such an infrastructure includes a combination of a wide area network (WAN) and wireless infrastructure, which allows a user to use the user device 1805 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by Wi-Fi® products based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the user device 1805.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 805 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 805 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
   a ground plane;
   a first radio frequency (RF) feed;
   RF circuitry coupled to the first RF feed;
   an antenna element coupled to the first RF feed, the antenna element comprising a first arm and a second arm; and
   a single-pole-single-throw (SPST) switch coupled between the antenna element and the ground plane,
   wherein the RF circuitry is operable to control the SPST switch between a closed state and an open state,
   wherein the RF circuitry is operable to cause a first current flow on the antenna element to achieve a first radiation pattern of electromagnetic energy in a first resonant mode when the SPST switch is in the closed state,
   wherein the antenna element operates as a loop antenna when the SPST switch is in the closed state,
   wherein the RF circuit is operable to cause a second current flow on the antenna element to achieve a second radiation pattern of electromagnetic energy in a second resonant mode when the SPST switch is in the open state,
   wherein the antenna element operates as a monopole antenna when the SPST switch is in the open state,
   wherein the second radiation pattern is different than the first radiation pattern,
   wherein the ground plane comprises a first edge and a second edge that collectively form a cutout area in which the antenna element is disposed in a same plane as the ground plane,
   wherein the RF feed is disposed on the first edge and the first arm extends from the RF feed in a first direction perpendicular to the first edge; and
   wherein the SPST switch is coupled to a grounding point disposed on the second edge and the second arm extends in a second direction perpendicular to the second edge, the second arm and the first arm being coupled at distal ends away from the ground plane.

2. The electronic device of claim 1, wherein the RF circuitry comprises a wireless local area network (WLAN) module, and wherein the WLAN module is operable to cause the antenna element to radiate or receive electromagnetic energy in a first frequency range in the first resonant mode and in a second frequency range in the second resonant mode.

3. The electronic device of claim 1, wherein the antenna element is self-resonant at approximately 5.5 GHz when the SPST switch is in the closed state, and wherein the antenna element is self-resonant at approximately 2.4 GHz when the SPST switch is in the open state.

4. The electronic device of claim 1, wherein the antenna element comprises:
   the first arm having a first end and a second end and extending in the first direction, the first end being coupled to the first RF feed; and
   the second arm having a first end and a second end and extending in the second direction that is perpendicular to the first direction, the first end of the second arm being coupled to the second end of the first arm, and wherein a first terminal of the SPST switch is coupled to the second end of the second arm and a second terminal of the SPST switch is coupled to a grounding point on the ground plane.

5. An apparatus comprising:
   a first antenna element, wherein the first antenna element is self-resonant at a first frequency in a first mode and at a second frequency in a second mode;
   a first radio frequency (RF) feed coupled to a first end of the first antenna element;
   a RF circuit coupled to the first RF feed; and
   a first RF switch coupled the first antenna element,
   wherein the first antenna element comprises a first arm and a second arm, the first arm extending from a first edge of a ground plane in a first direction and the second arm extending from a distal end of the first arm in a second direction that is perpendicular to the first direction to a grounding point on a second edge of the ground plane,
   wherein the first edge and the second edge collectively form a cutout area in which the first antenna element is disposed in a same plane as the ground plane,
   wherein the RF circuit is operable to control the first RF switch to switch the first antenna element between the first mode and the second mode, and
   wherein the RF circuit is operable to cause the first antenna element to radiate or receive electromagnetic energy in a first radiation pattern in the first mode and to radiate or electromagnetic energy in a second radiation pattern in the second mode.

6. The apparatus of claim 5, wherein the RF circuit comprises a wireless local area network (WLAN) module, wherein the RF circuit is operable to cause the first antenna element to radiate or receive electromagnetic energy in a first frequency range in the first mode and in a second frequency range in the second mode.

7. The apparatus of claim 6, wherein the first frequency range is between approximately 4.8 GHz and approximately 6.0 GHz, and wherein the second frequency range is between approximately 2.4 GHz and approximately 2.5 GHz.

8. The apparatus of claim 5, wherein the first antenna element comprises:
the first arm having a first end and a second end and extending in the first direction, the first end being coupled to the first RF feed; and
the second arm having a first end and a second end and extending in the second direction, the first end of the second arm being coupled to the second end of the first arm, wherein the first RF switch is a single-pole-single-throw (SPST) switch, wherein a first terminal of the SPST switch is coupled to the second end of the second arm and a second terminal of the SPST switch is coupled to a grounding point on the ground plane.

9. The apparatus of claim 5, wherein the first antenna element operates as a loop antenna in the first mode, and wherein the first antenna element operates as a monopole antenna in the second mode.

10. The apparatus of claim 5, further comprising:
a second antenna element, wherein the second antenna element is self-resonant at a third frequency and at a fourth frequency;
a second RF feed coupled to the RF circuit and to a first end of the second antenna element; and
a second RF switch coupled the second antenna element,
wherein the RF circuit is operable to control the first RF switch and the second RF switch to switch the first antenna element and the second antenna element between the first mode, the second mode, a third mode and a fourth mode, and
wherein the RF circuit is operable to cause the second antenna element to radiate or receive electromagnetic energy in a third radiation pattern in the third mode and to radiate or receive electromagnetic energy in a fourth radiation pattern in the fourth mode.

11. The apparatus of claim 10, wherein the RF circuit is operable to cause the first antenna element to radiate or receive electromagnetic energy in a first frequency range in the first mode and in a second frequency range in the second mode, and wherein the RF circuit is operable to cause the second antenna element to radiate or receive electromagnetic energy in a third frequency range in the third mode and in a fourth frequency range in the fourth mode.

12. The apparatus of claim 11, wherein the RF circuit is operable to cause:
in the first mode,
the first antenna element to radiate or receive electromagnetic energy in the first frequency range; and
the second antenna element to radiate or receive electromagnetic energy in the third frequency range,
in the second mode,
the first antenna element to radiate or receive electromagnetic energy in the second frequency range; and
the second antenna element to radiate or receive electromagnetic energy in the fourth frequency range,
in the third mode,
the first antenna element to radiate or receive electromagnetic energy in the first frequency range; and
the second antenna element to radiate or receive electromagnetic energy in the fourth frequency range, and
in the fourth mode,
the first antenna element to radiate or receive electromagnetic energy in the second frequency range; and
the second antenna element to radiate or receive electromagnetic energy in the third frequency range.

13. The apparatus of claim 12, wherein the first frequency range and the third frequency range are between approximately 4.8 GHz and approximately 6.0 GHz and the second frequency range and the fourth frequency range are between approximately 2.4 GHz and approximately 2.5 GHz.

14. The apparatus of claim 12, wherein the first mode is a loop-loop mode in which the first antenna element operates as a first loop antenna and the second antenna element operates as a second loop antenna, wherein the second mode is a monopole-monopole mode in which the first antenna element operates as a first monopole antenna and the second antenna element operates as a second monopole antenna, wherein the third mode is a loop-monopole mode in which the first antenna element operates as the first loop antenna and the second antenna element operates as the second monopole antenna, and wherein the fourth mode is a monopole-loop mode in which the first antenna element operates as the first monopole antenna and the second antenna element operates as the second loop antenna.

15. The apparatus of claim 10, wherein the first antenna element comprises:
the first arm having a first end and a second end and extending in the first direction, the first end being coupled to the first RF feed; and
the second arm having a first end and a second end and extending in the second direction, the first end of the second arm being coupled to the second end of the first arm, and
wherein the second antenna element comprises:
a third arm having a first end and a second end and extending in a third direction, the first end of the third arm being coupled to the second RF feed; and
a fourth arm having a first end and a second end and extending in the second direction, the first end of the fourth arm coupled to the second end of the third arm.

16. The apparatus of claim 15, wherein the first RF switch is a first single-pole-single-throw (SPST) switch, wherein a first terminal of the first SPST switch is coupled to the second end of the second arm and a second terminal of the first SPST switch is coupled to a first grounding point on the ground plane, wherein the second RF switch is a second SPST switch, wherein a first terminal of the second SPST switch is coupled to the second end of the fourth arm and a second terminal of the second SPST switch is coupled to a second grounding point on the ground plane.

17. An electronic device comprising:
a ground plane;
a first radio frequency (RF) feed;
a second RF feed;
RF circuitry coupled to the first RF feed and the second RF feed;
a first antenna element coupled to the first RF feed;
a second antenna element coupled to the second RF feed;
a first single-pole-single-throw (SPST) switch coupled between the first antenna element and the ground plane; and
a second SPST switch coupled between the second antenna element and the ground plane,
wherein the first antenna element comprises a first arm and a second arm, the first arm extending from a first edge of a ground plane in a first direction and the second arm extending from a distal end of the first arm in a second direction that is perpendicular to the first direction to a first grounding point on a second edge of the ground plane, wherein the first edge and the second edge collectively form a first cutout area in which the first antenna element is disposed in a same plane as the ground plane, wherein the second antenna element comprises a third arm and a fourth arm, the third arm extending from a third edge of the ground plane in a third direction and the fourth arm extending from a distal end of the third arm in a fourth direction that is perpendicular to the third direction to a second grounding point on a fourth edge of the ground plane, wherein the third edge and the fourth edge collectively form a second cutout area in which the second antenna element is disposed in the same plane as the ground plane, wherein the RF circuitry is operable to control the first and second SPST switches between a closed state and an open state, respectively, wherein the RF circuitry is operable to cause a first current flow on the first antenna element to achieve a first radiation pattern of electromagnetic energy in a first resonant mode when the first SPST switch is in the closed state, wherein the RF circuit is operable to cause a second current flow on the first antenna element to achieve a second radiation pattern of electromagnetic energy in a second resonant mode when the first SPST switch is in the open state, wherein the RF circuitry is operable to cause a third current flow on the second antenna element to achieve a third radiation pattern of electromagnetic energy in a third resonant mode when the second SPST switch is in the closed state, wherein the RF circuit is operable to cause a fourth current flow on the second antenna element to achieve a fourth radiation pattern of electromagnetic energy in a fourth resonant mode when the second SPST switch is in the open state, and wherein the first, second, third and fourth radiation patterns are different radiation patterns.

18. The electronic device of claim 17, wherein the first antenna element operates as a first loop antenna when the first SPST switch is in the closed state, wherein the second antenna element operates as a second loop antenna when the second SPST switch is in the closed state, wherein the first antenna element operates as a first monopole antenna when the first SPST switch is in the open state, and wherein the second antenna element operates as a second monopole antenna when the second SPST switch is in the open state.

19. The electronic device of claim 17, wherein the first antenna element is self-resonant at approximately 5.5 GHz when the SPST switch is in the closed state, and wherein the first antenna element is self-resonant at approximately 2.4 GHz when the SPST switch is in the open state.

20. The electronic device of claim 17, wherein the first antenna element comprises:
the first arm having a first end and a second end and extending in the first direction, the first end being coupled to the first RF feed; and
the second arm having a first end and a second end and extending in the second direction, the first end of the second arm being coupled to the second end of the first arm, wherein a first terminal of the first SPST switch is coupled to the second end of the second arm and a second terminal of the first SPST switch is coupled to a grounding point on the ground plane.

* * * * *